(12) United States Patent
Maetaki

(10) Patent No.: US 7,864,453 B2
(45) Date of Patent: Jan. 4, 2011

(54) OPTICAL SYSTEM AND OPTICAL APPARATUS INCLUDING OPTICAL SYSTEM

(75) Inventor: Satoshi Maetaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 12/431,180

(22) Filed: Apr. 28, 2009

(65) Prior Publication Data

US 2009/0273845 A1  Nov. 5, 2009

(30) Foreign Application Priority Data

May 1, 2008  (JP)  ............................. 2008-119582

(51) Int. Cl.
*G02B 9/00* (2006.01)
(52) U.S. Cl. ........................................ 359/754; 359/676
(58) Field of Classification Search ............... 359/676, 359/690, 691, 689, 754
See application file for complete search history.

(56) References Cited

U.S. PATENT DOCUMENTS 7,292,398 B1  11/2007  Misaka
2006/0109557 A1*  5/2006  Maetaki ...................... 359/642

FOREIGN PATENT DOCUMENTS

JP  S63-285511 A  11/1988

* cited by examiner

*Primary Examiner*—Joseph Martinez
*Assistant Examiner*—James R Greece
(74) *Attorney, Agent, or Firm*—Canon U.S.A., Inc. I.P. Division

(57) ABSTRACT

Provided is an optical system in which chromatic aberrations can be excellently corrected in spite of environmental changes, to thereby maintain high optical performance. The optical system includes: a plurality of optical elements each having refractive surfaces located in a light incident side and a light exit side; and an aperture stop. A focal length, an Abbe number of a material, and an extraordinary partial dispersion ratio of each of an l-th optical element and an r-th optical element which satisfy a condition related to the extraordinary partial dispersion ratio are suitably set.

10 Claims, 14 Drawing Sheets

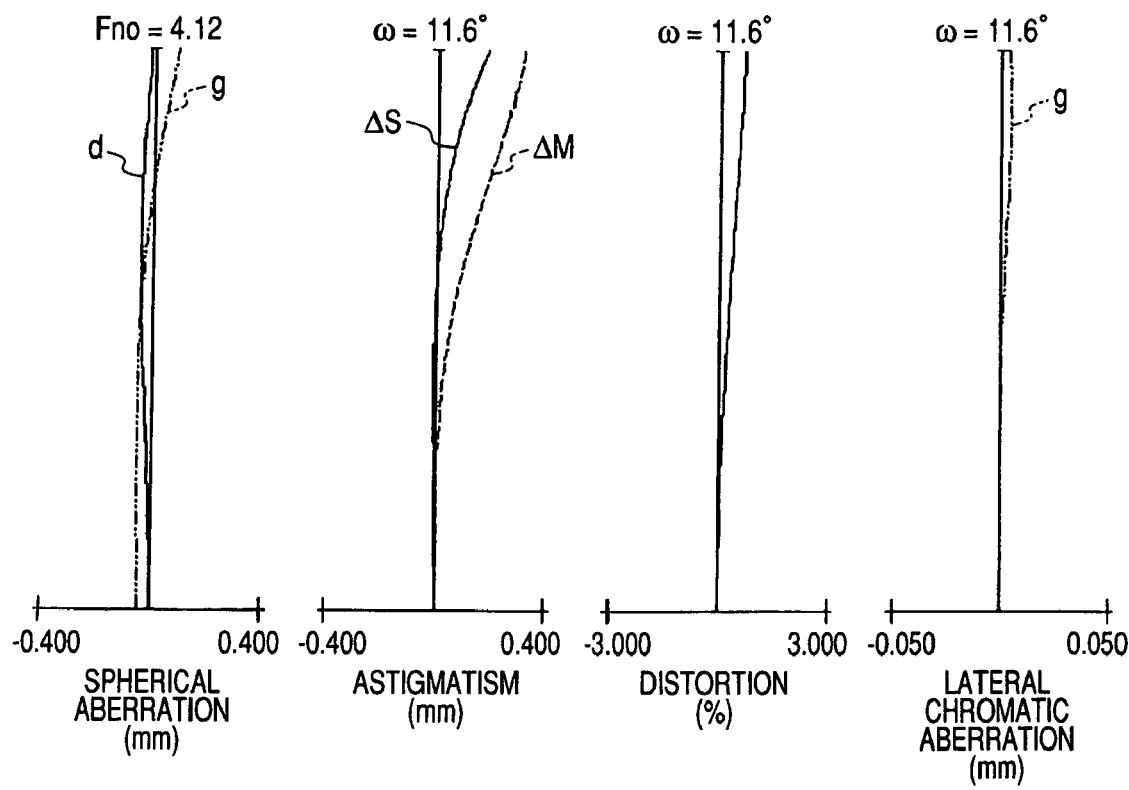
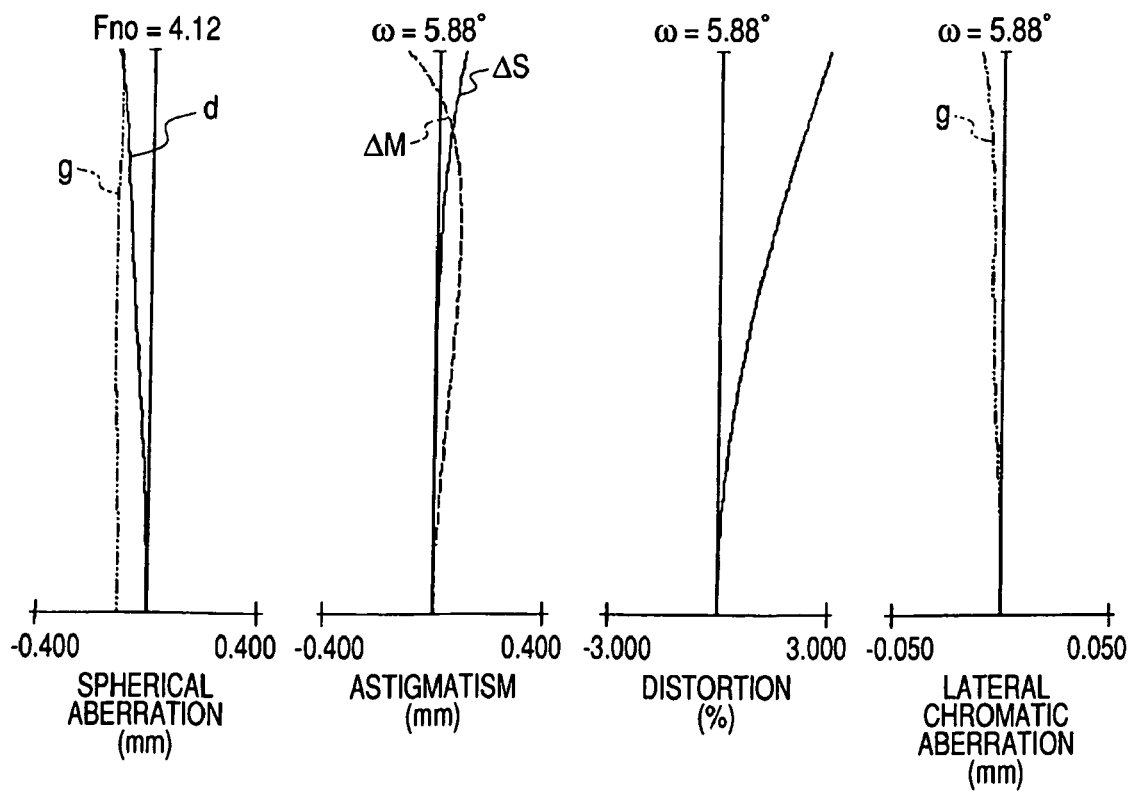

OPTICAL SYSTEM AND OPTICAL APPARATUS INCLUDING OPTICAL SYSTEM

BACKGROUND OF THE INVENTION

1. Field of the Invention

The present invention relates to an optical system and an optical apparatus including the optical system, and is suitable for use in an optical apparatus such as a silver-halide film camera, a digital still camera, a video camera, a telescope, binoculars, a projector, or a copying machine.

2. Description of the Related Art

An optical system used for an optical apparatus such as a digital camera or a video camera is required to have a short total lens length (length between first lens surface located on object side and image plane) and high optical performance.

It is desired that a change in optical performance be small even under environmental changes such as changes in temperature, atmospheric pressure, and humidity.

In general, along with a further reduction in size of the optical system, various aberrations, for example, chromatic aberrations such as axial chromatic aberration and lateral chromatic aberration, are increasingly generated to degrade the optical performance.

For many optical systems, in order to reduce the chromatic aberrations while shortening the total lens length, for example, it is desirable to use a lens made of a material having extraordinary partial dispersion, such as a fluorite, and increase a refractive power of the lens. However, when a refractive power of a lens made of low-dispersion glass having a large Abbe number, such as the fluorite, is to be adjusted by a large amount to correct the chromatic aberrations, various aberrations other than the chromatic aberrations, for example, spherical aberration, coma, and astigmatism are increasingly generated.

An optical system using an optical element made of an optical material having strong extraordinary partial dispersion, for example, an organic material, has been proposed as the optical system having reduced chromatic aberrations (U.S. Pat. No. 7,292,398).

According to U.S. Pat. No. 7,292,398, the optical element made of the organic material having strong extraordinary partial dispersion is given a refractive power to achieve a chromatic aberration balance with another optical element made of glass, thereby reducing the chromatic aberrations of the entire optical system.

However, a refractive index change dn/dt of the organic material such as plastic takes a larger value than that of glass with respect to a change in temperature, and is, for example, approximately 10 times to 200 times larger than that of glass.

Therefore, when the optical element which is made of the organic material provided with a strong refractive power is used, it is important to reduce focal and aberration variations of the optical system caused by the change in temperature.

An optical system in which a plurality of plastic lenses are combined to compensate for the focal variation caused by the change in environmental temperature has been proposed as the optical system using the optical element made of the organic material (Japanese Patent Application Laid-Open No. S63-285511). However, it is difficult to correct the chromatic aberrations of the optical system with the method disclosed in Japanese Patent Application Laid-Open No. S63-285511.

Therefore, when the chromatic aberrations of the optical system are corrected using the optical element made of the organic material, it is also important to reduce the variations in chromatic aberrations caused by the environmental changes, particularly, the change in temperature in order to maintain high optical performance.

For example, when the optical element made of the organic material having the extraordinary partial dispersion characteristic is used for the optical system, it is important to suitably set a position on the optical path and a refractive power.

When such conditions are unsuitable, it is difficult to maintain high optical performance under the environmental changes while the entire optical system is reduced in size.

SUMMARY OF THE INVENTION

It is an object of the present invention to provide an optical system in which a chromatic aberration is excellently corrected, and in which variation in chromatic aberration is small and high optical performance can be maintained in spite of environmental changes, and an optical apparatus including the optical system.

According to the present invention, an optical system comprises: a plurality of optical elements each having refractive surfaces located on a light incident side and a light exit side; and an aperture stop, wherein letting an l-th optical element be an optical element of the plurality of optical elements which satisfies $0.0272 < |\Delta\theta gF|$; and letting an r-th optical element be an optical element which satisfies $|\Delta\theta gF| < 0.0272$, where $\Delta\theta gF$ represents an extraordinary partial dispersion ratio with respect to a g-line and an F-line, the l-th optical element and the r-th optical element are located in one of an object side and an image side with respect to the aperture stop, wherein, for the l-th optical element, letting an i-th optical element (where i=1, 2, ..., m) be an optical element located at an i-th position from the light incident side; and, for the r-th optical element, letting a j-th optical element (where j=1, 2, ..., n) be an optical element located at a j-th position from the light incident side, the following conditions are satisfied: $\Sigma(1/fnr_j)/\Sigma(1/fnl_i) < 0$ $5.0 < |\Sigma((\Delta\theta gFnl_i/vdnl_i)/fnl_i)/\Sigma((\Delta\theta gFnr_j/vdnr_j)/fnr_j)|$ where $fnl_i$ indicates a focal length of the i-th optical element, $vdnl_i$ indicates an Abbe number of a material of the i-th optical element, $\Delta\theta gFnl_i$ indicates an extraordinary partial dispersion ratio with respect to the g-line and the F-line in the i-th optical element, $fnr_j$ indicates a focal length of the j-th optical element, $vdnr_j$ indicates an Abbe number of a material of the j-th optical element, and $\Delta\theta gFnr_j$ indicates an extraordinary partial dispersion ratio with respect to the g-line and the F-line in the j-th optical element.

Further features of the present invention become apparent from the following description of exemplary embodiments with reference to the attached drawings.

BRIEF DESCRIPTION OF THE DRAWINGS

FIGS. 11A, 11B, and 11C are aberration charts in the optical system according to Embodiment 5 of the present invention at an environmental temperature of 40° C.

FIGS. 12A, 12B, and 12C are aberration charts in the optical system according to Embodiment 5 of the present invention at an environmental temperature of −20° C.

DESCRIPTION OF THE EMBODIMENTS

Hereinafter, an optical system according to each of embodiments of the present invention and an optical apparatus including the optical system are described.

The optical system according to the present invention includes a plurality of optical elements which are provided in an object side or an image side with respect to a stop (aperture stop) and each have refractive surfaces both on a light incident side and a light exit side. Materials and refractive powers of the optical elements are suitably set.

Figure 1:
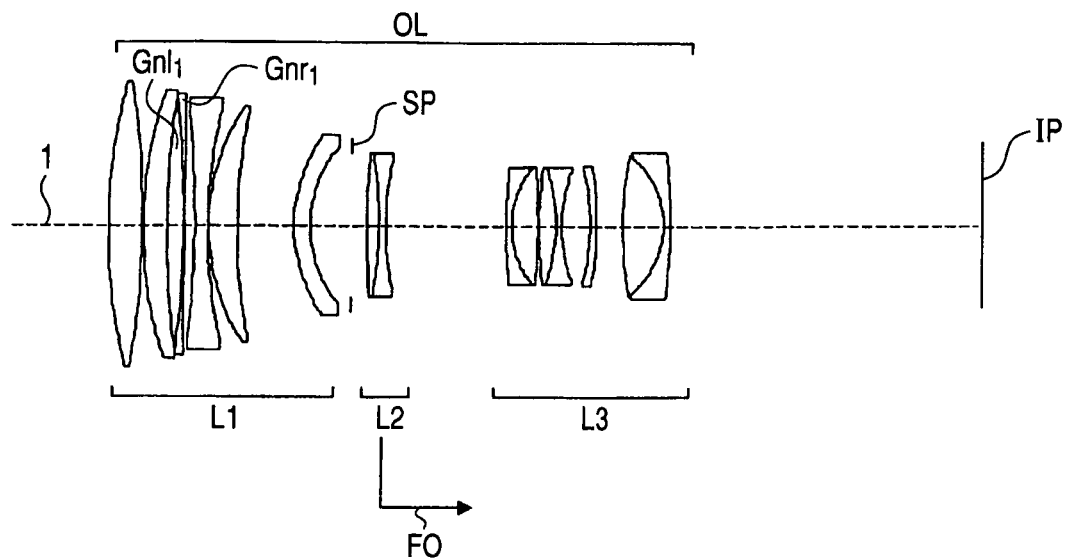
FIG. 1 is an optical cross sectional view illustrating an optical system according to Embodiment 1 of the present invention.

FIG. 1 is a lens cross sectional view illustrating an optical system according to Embodiment 1 of the present invention.

Figure 2A:
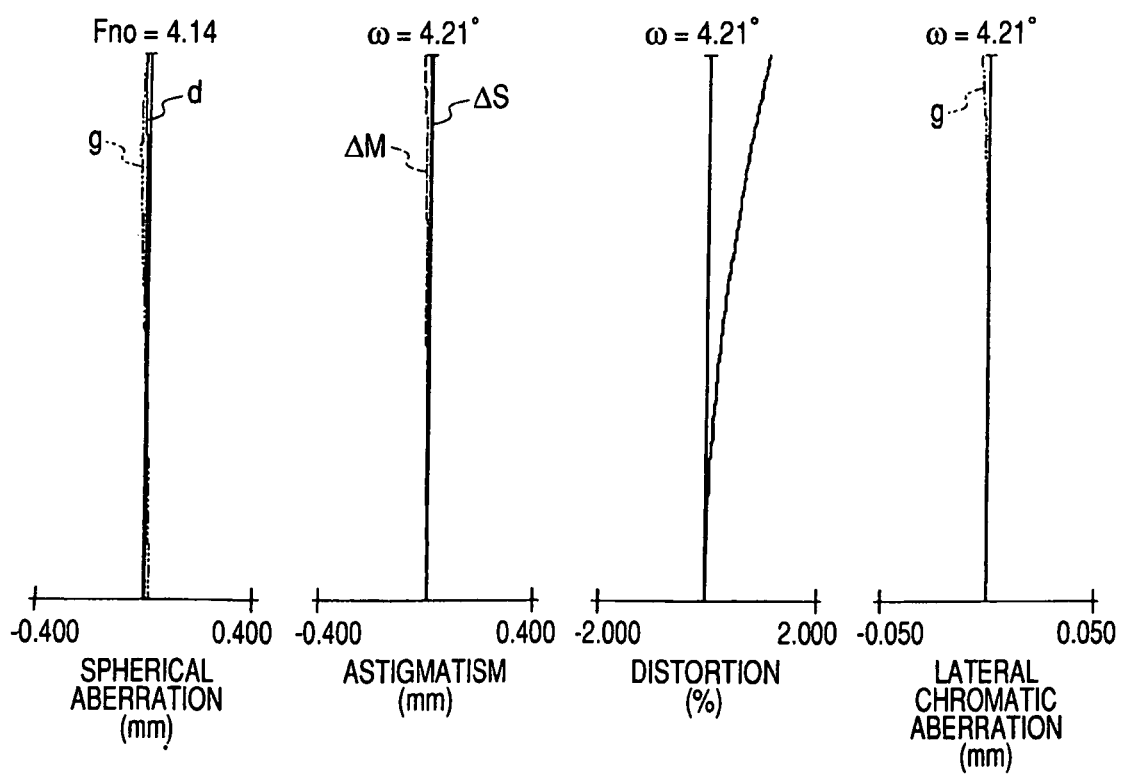
FIGS. 2A, 2B, and 2C are aberration charts in the optical system according to Embodiment 1 of the present invention.
Figure 2B:
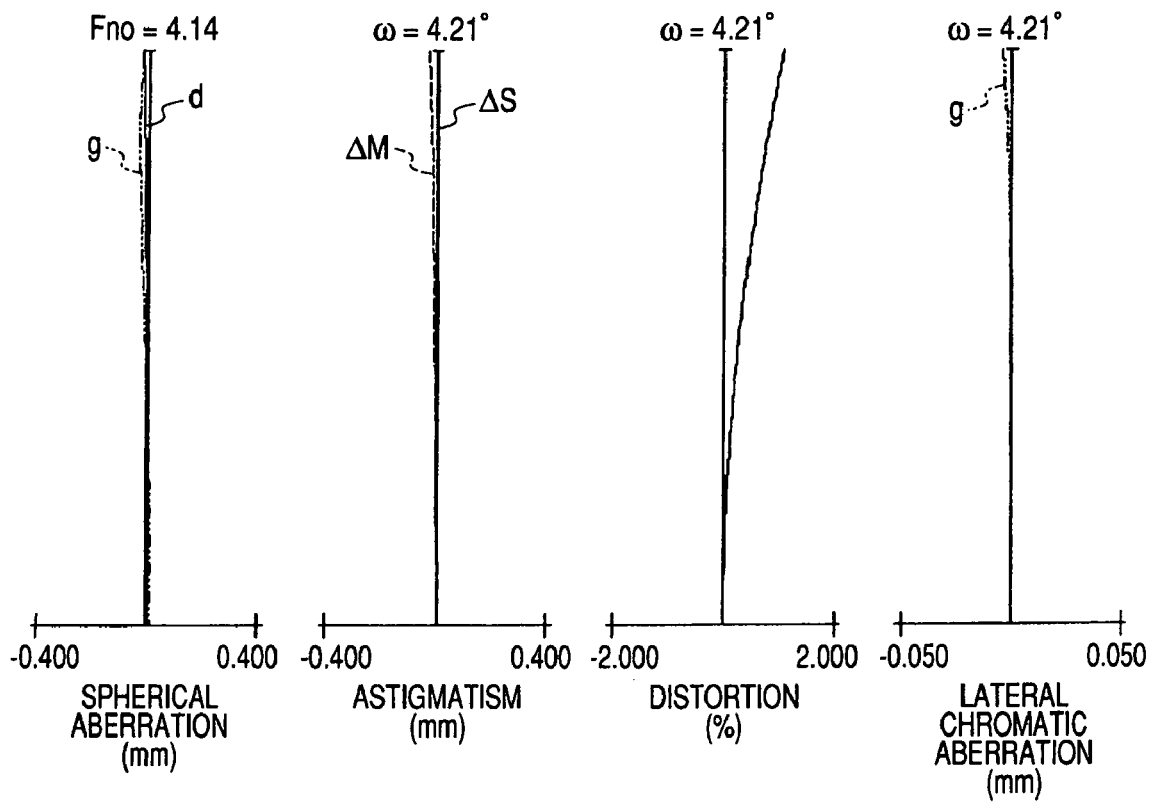
Figure 2C:
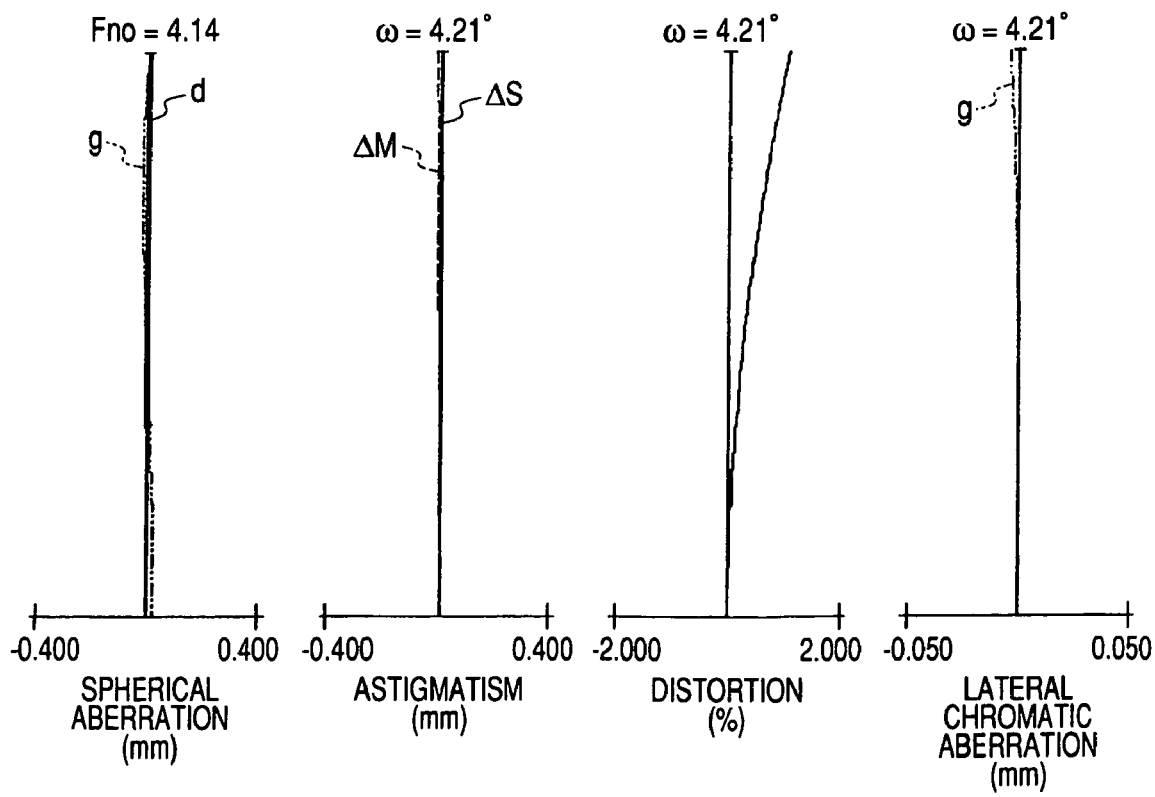

FIGS. 2A, 2B, and 2C are aberration charts in the optical system according to Embodiment 1 of the present invention at environmental temperatures of 25° C., 40° C., and −20° C., respectively.

Figure 3:
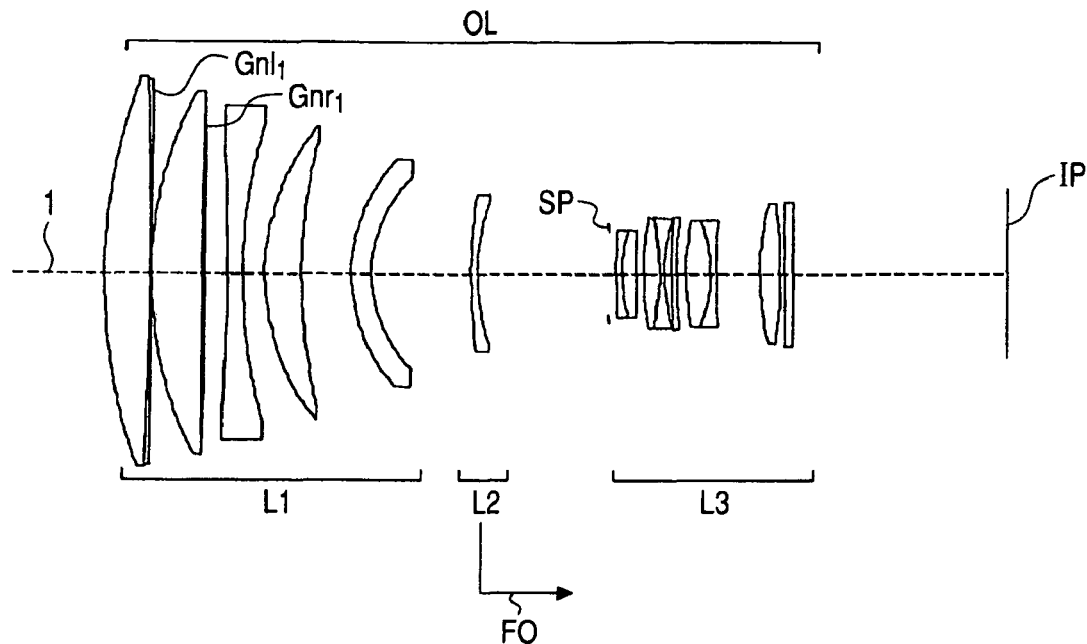
FIG. 3 is an optical cross sectional view illustrating an optical system according to Embodiment 2 of the present invention.

FIG. 3 is a lens cross sectional view illustrating an optical system according to Embodiment 2 of the present invention.

Figure 4A:
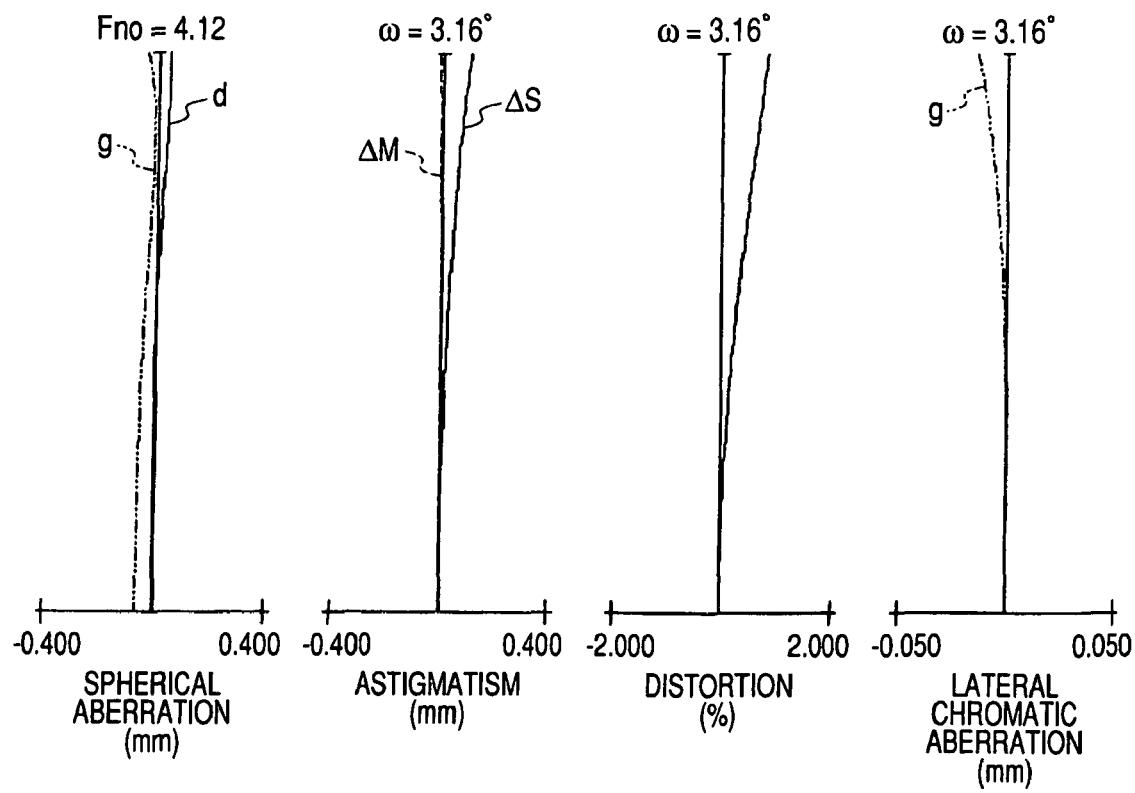
FIGS. 4A, 4B, and 4C are aberration charts in the optical system according to Embodiment 2 of the present invention.
Figure 4B:
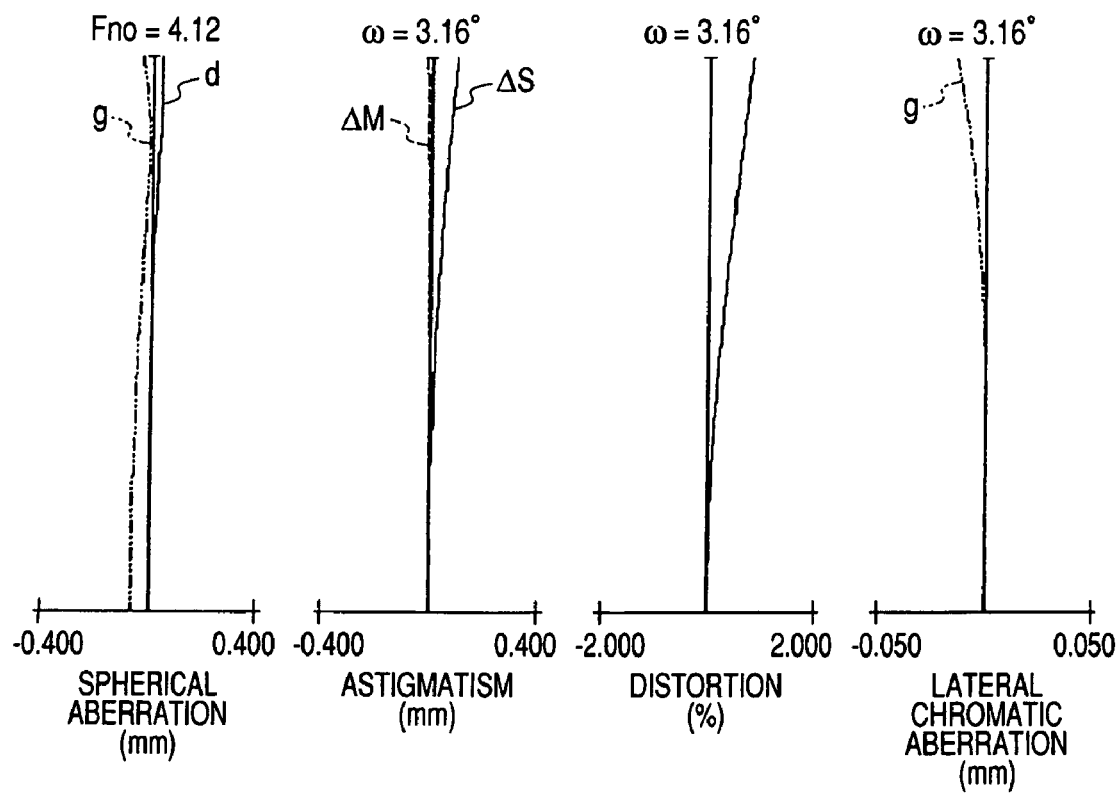
Figure 4C:
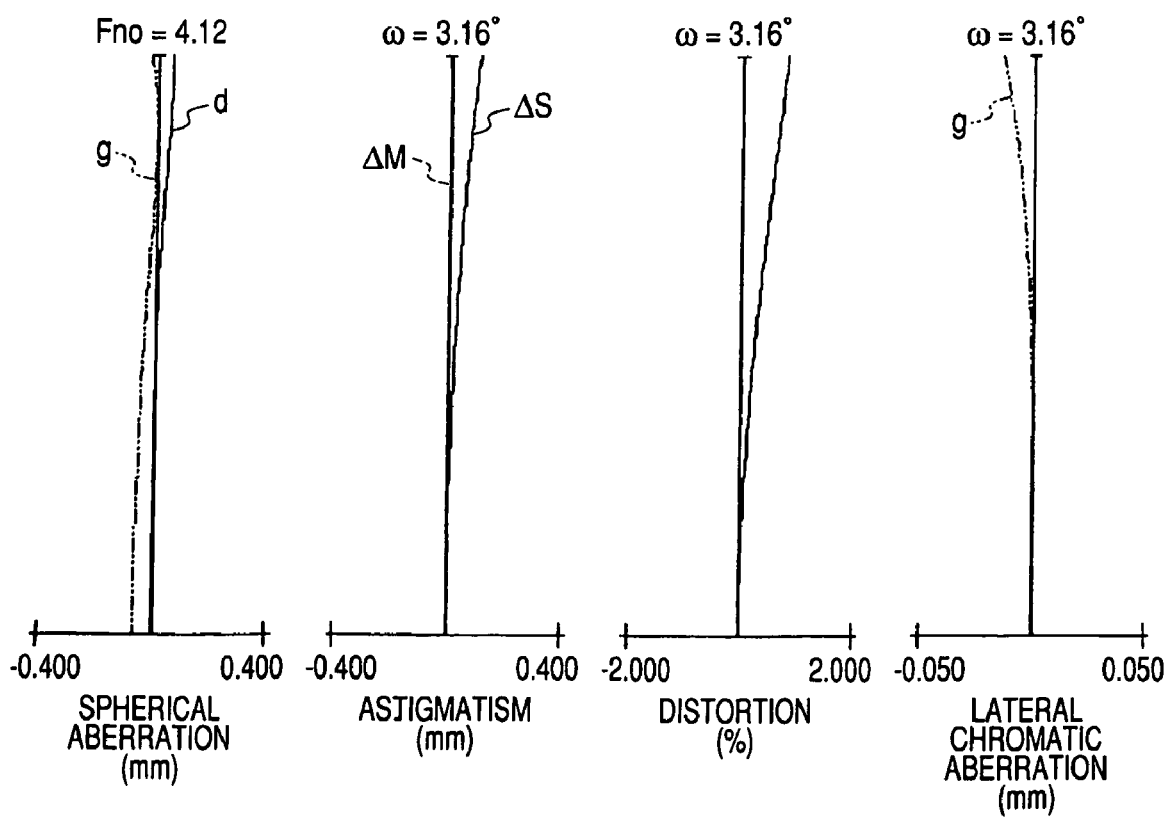

FIGS. 4A, 4B, and 4C are aberration charts in the optical system according to Embodiment 2 of the present invention at environmental temperatures of 25° C., 40° C., and −20° C., respectively.

Figure 5:
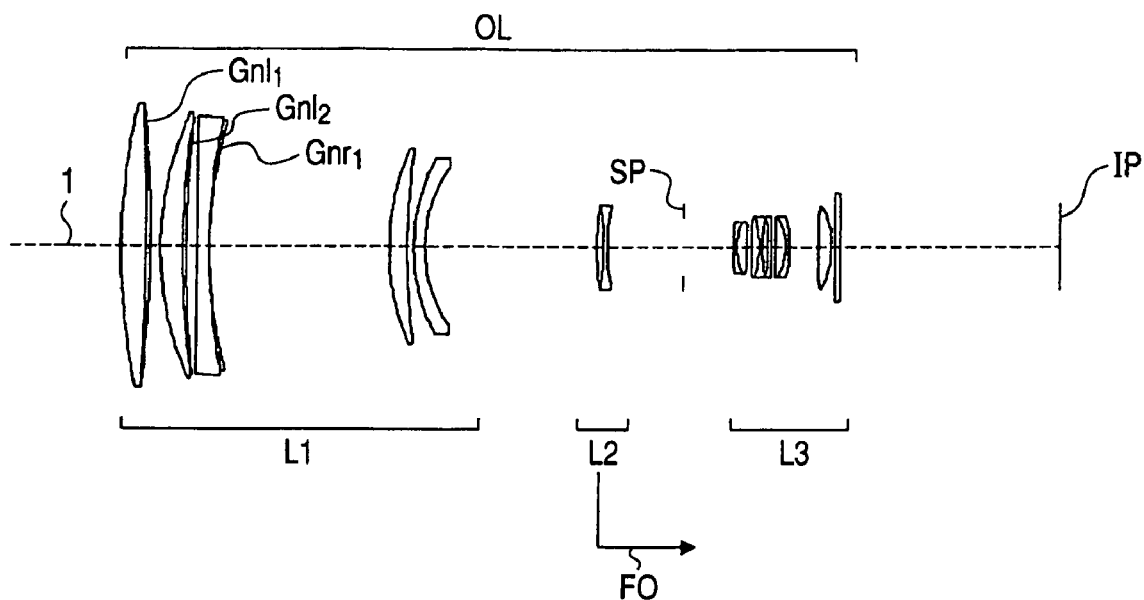
FIG. 5 is an optical cross sectional view illustrating an optical system according to Embodiment 3 of the present invention.

FIG. 5 is a lens cross sectional view illustrating an optical system according to Embodiment 3 of the present invention.

Figure 6A:
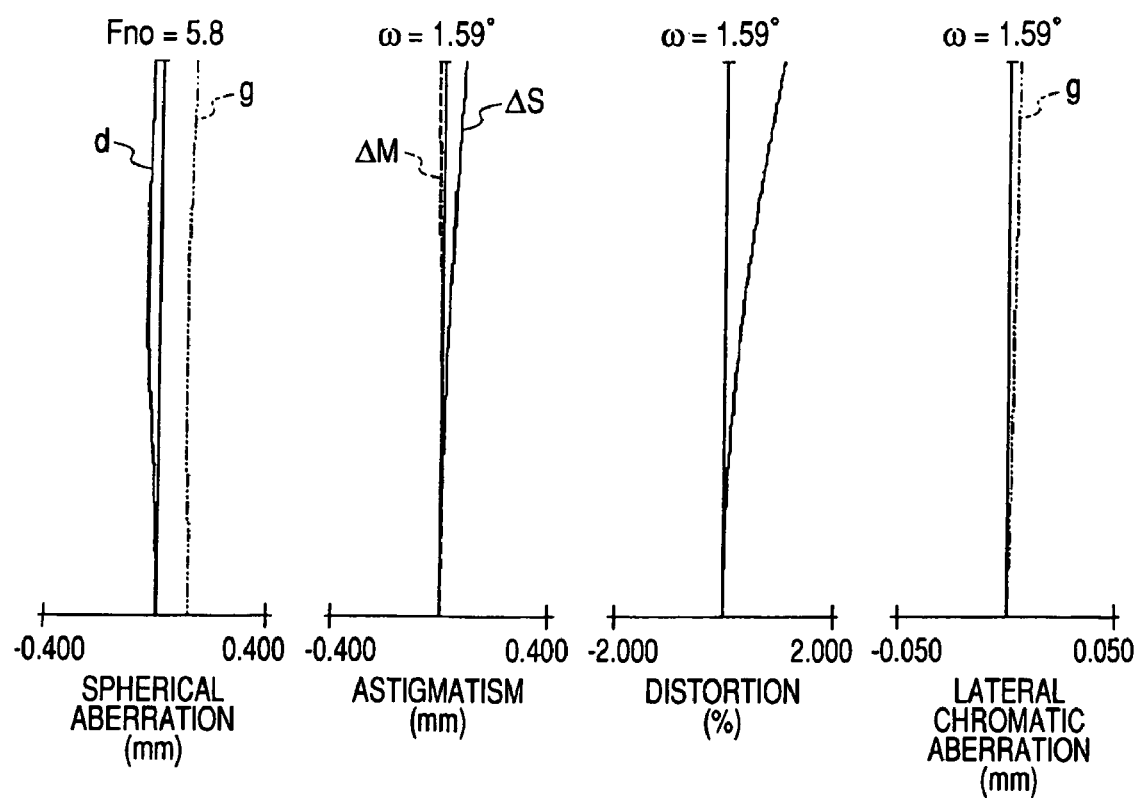
FIGS. 6A, 6B, and 6C are aberration charts in the optical system according to Embodiment 3 of the present invention.
Figure 6B:
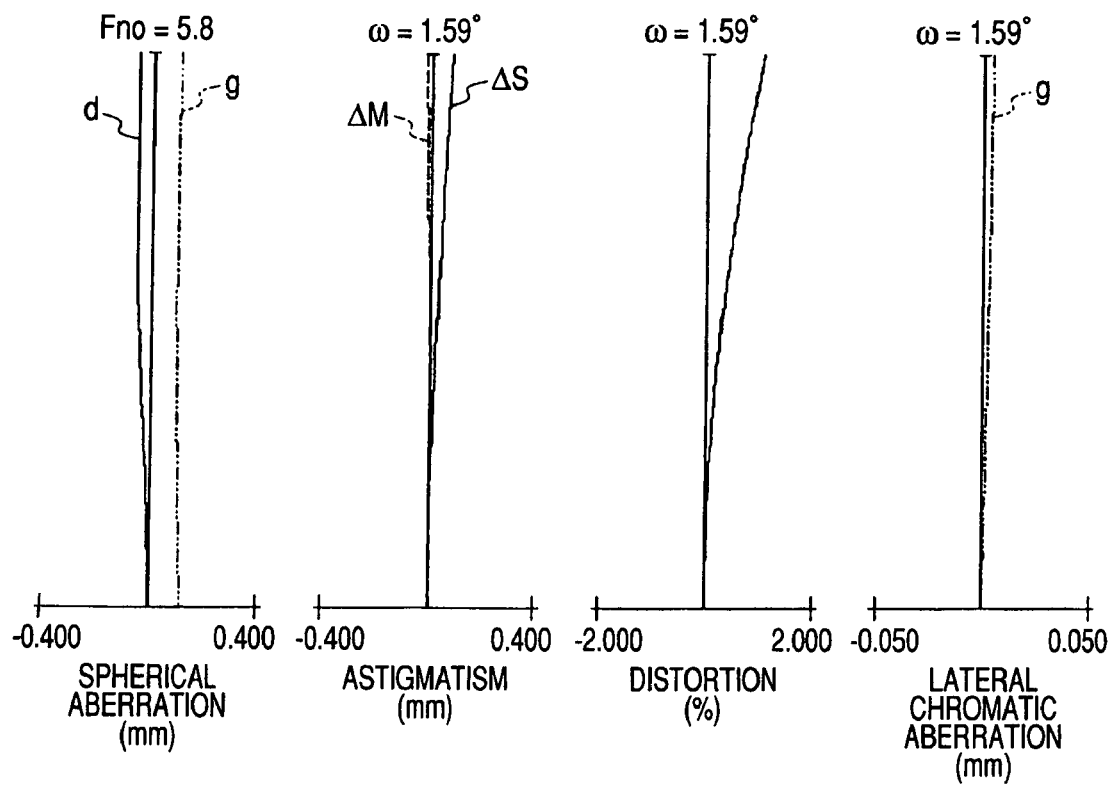
Figure 6C:
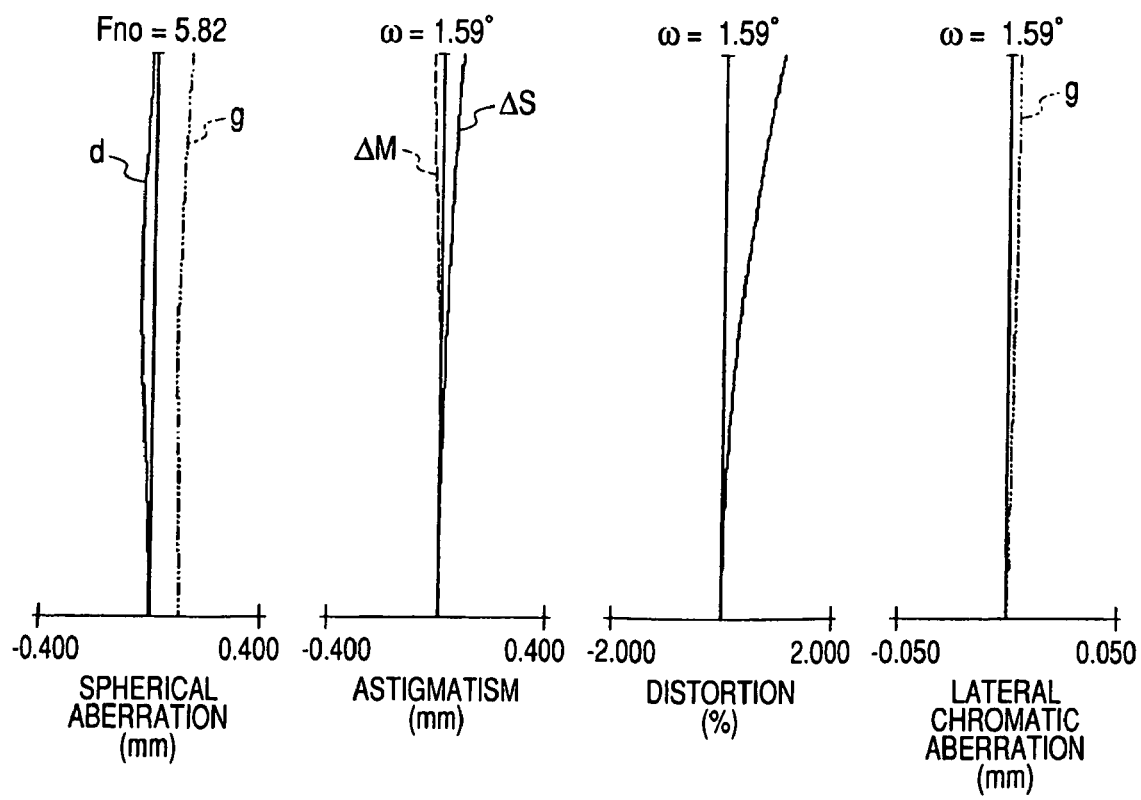

FIGS. 6A, 6B, and 6C are aberration charts in the optical system according to Embodiment 3 of the present invention at environmental temperatures of 25° C., 40° C., and −20° C., respectively.

Each of the optical systems according to Embodiments 1, 2, and 3 is a telephoto lens. In Embodiments 1, 2, and 3, the telephoto lens is the following optical system. That is, letting a point P be an intersection of an optical axis and a paraxial chief ray, the telephoto lens is an optical system in which a maximum value of a height of a paraxial marginal ray from the optical axis on a lens surface, which is located in an enlargement side with respect to the point P and closest to the enlargement side, is larger than a maximum value of a height from the optical axis, of the paraxial marginal ray passing through a lens surface, which is located in a reduction side with respect to the point P.

Figure 7:
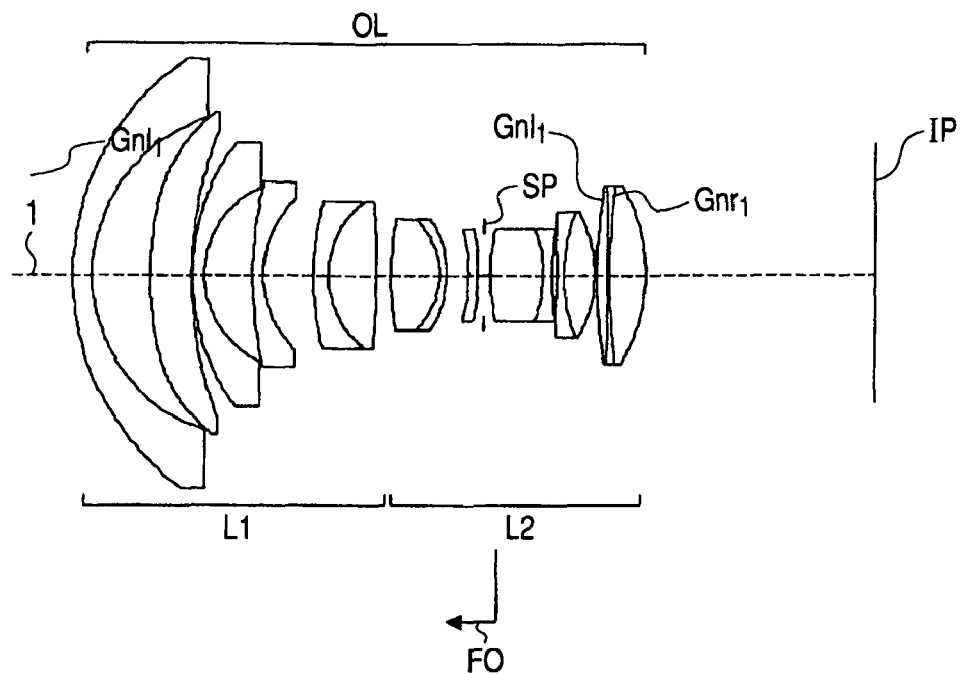
FIG. 7 is an optical cross sectional view illustrating an optical system according to Embodiment 4 of the present invention.

FIG. 7 is a lens cross sectional view illustrating an optical system according to Embodiment 4 of the present invention.

Figure 8A:
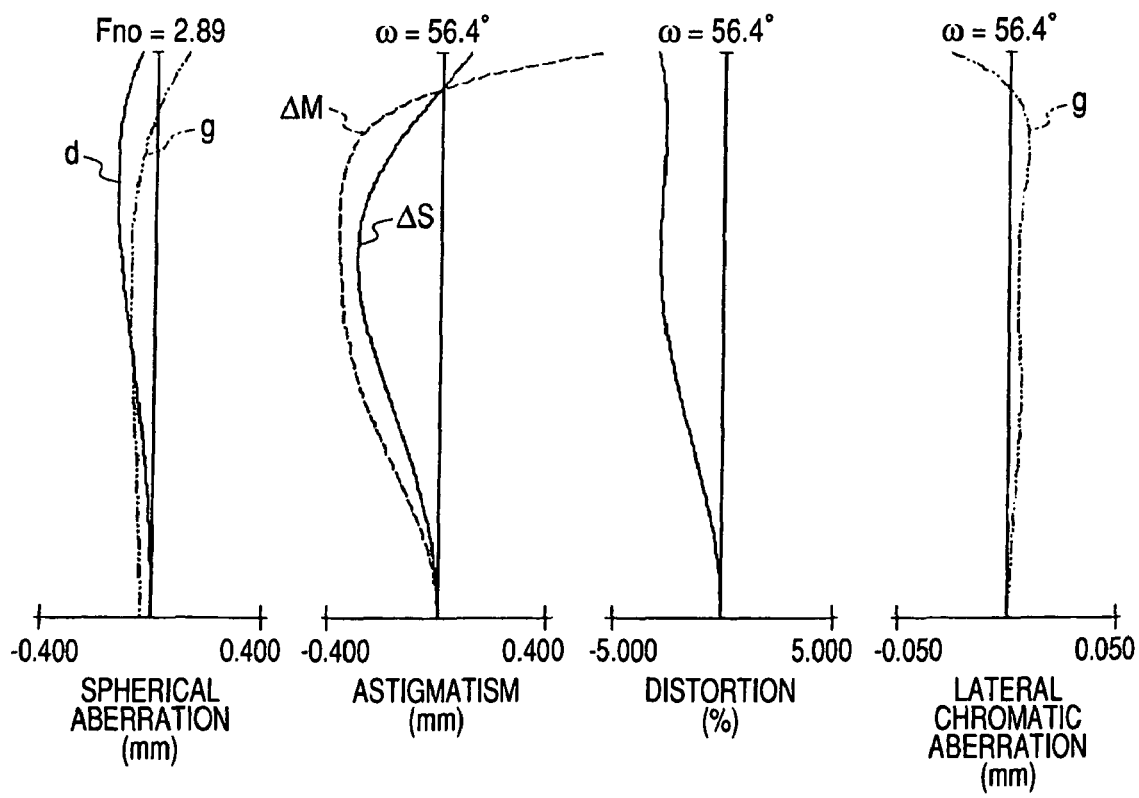
FIGS. 8A, 8B, and 8C are aberration charts in the optical system according to Embodiment 4 of the present invention.
Figure 8B:
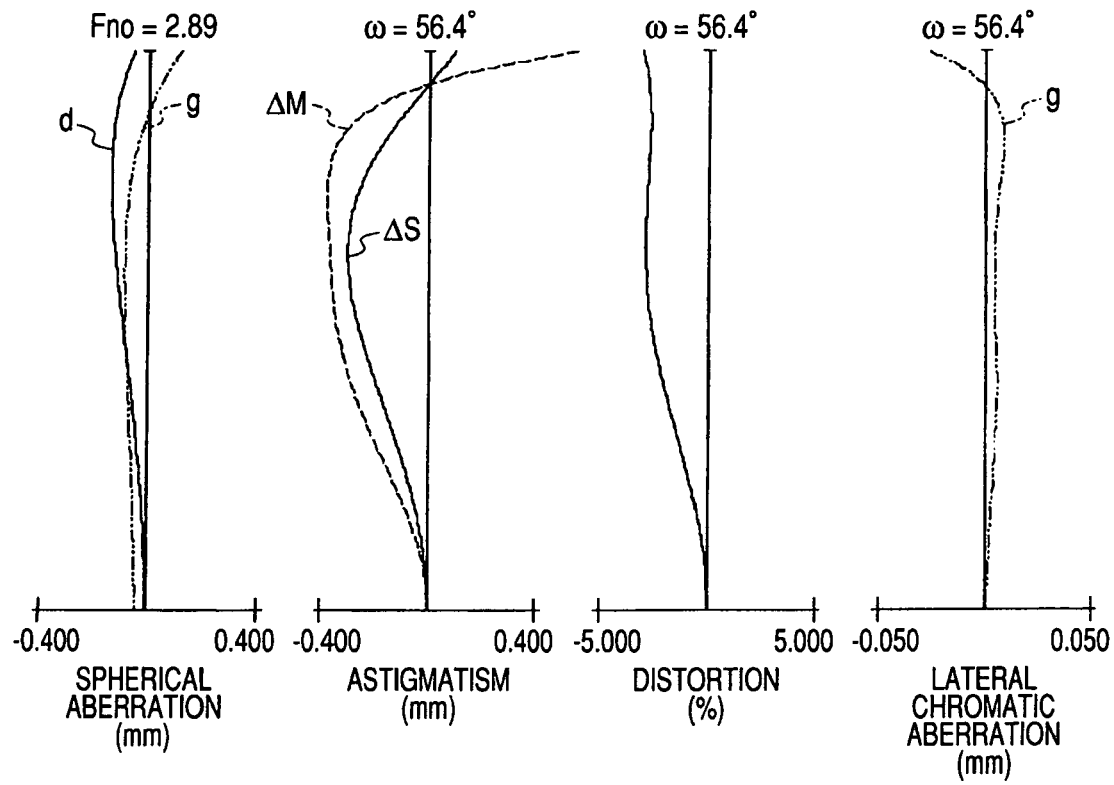
Figure 8C:
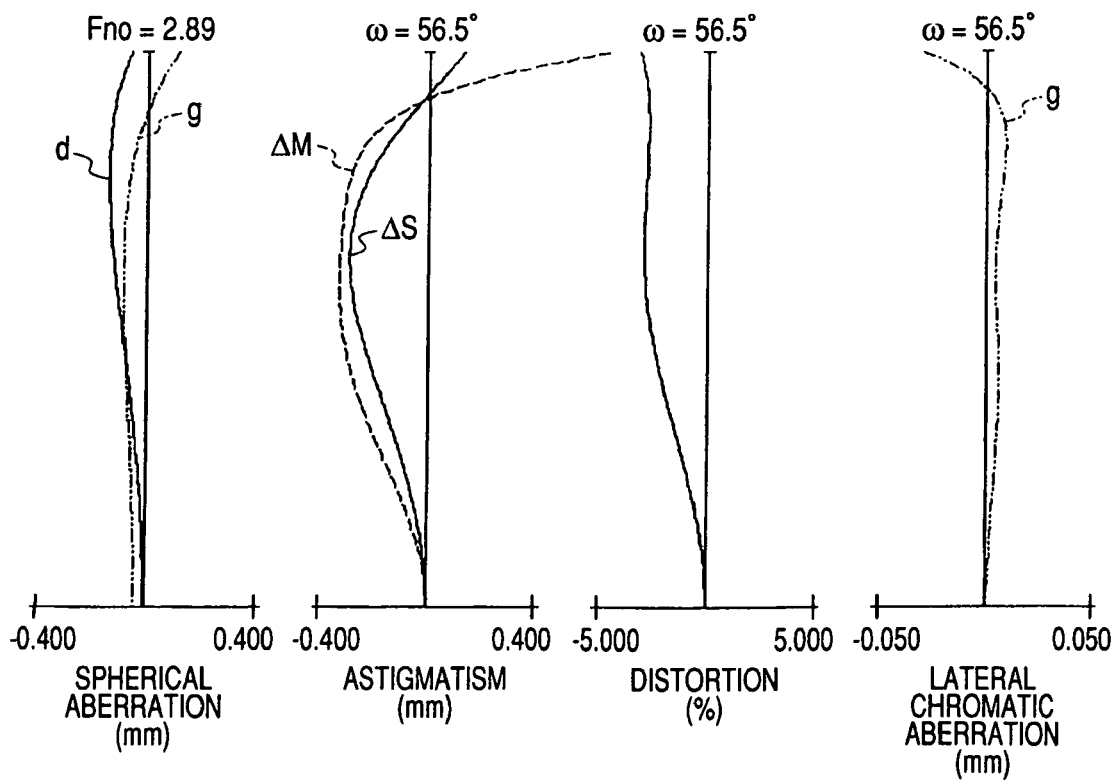

FIGS. 8A, 8B, and 8C are aberration charts in the optical system according to Embodiment 4 of the present invention at environmental temperatures of 25° C., 40° C., and −20° C., respectively.

The optical system according to Embodiment 4 is a wide-angle lens. In Embodiment 4, a retrofocus lens is the following optical system.

That is, letting the point P be an intersection of the optical axis and the paraxial chief ray, the retrofocus lens is an optical system in which the maximum value of the height of the paraxial marginal ray from the optical axis on the lens surface, which is located in the enlargement side with respect to the point P and closest to the enlargement side, is smaller than the maximum value of the height from the optical axis, of the paraxial marginal ray passing through the lens surface, which is located in the reduction side with respect to the point P.

Figure 9:
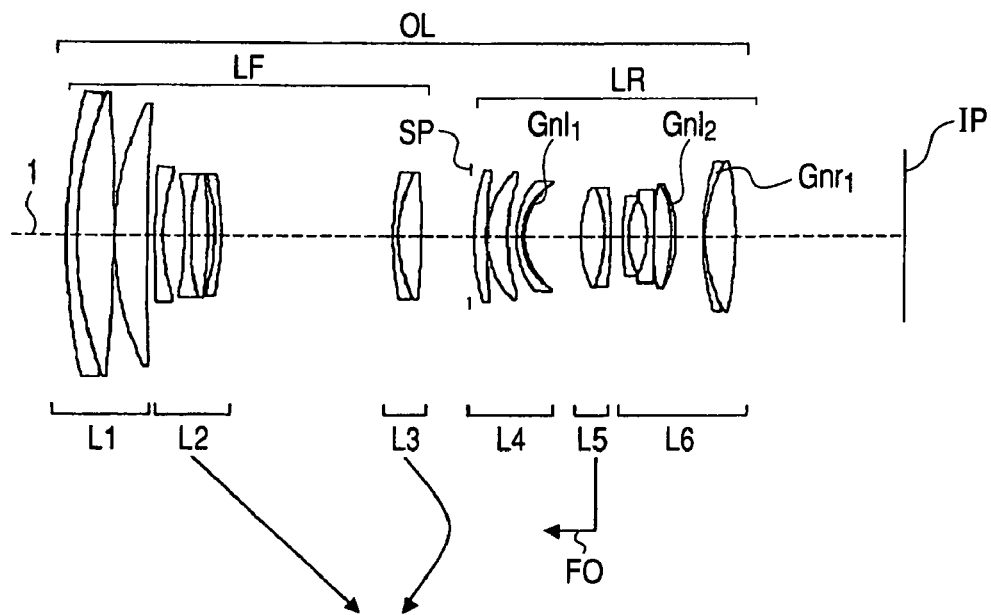
FIG. 9 is an optical cross sectional view illustrating an optical system according to Embodiment 5 of the present invention.

FIG. 9 is a lens cross sectional view illustrating an optical system according to Embodiment 5 of the present invention. The optical system according to Embodiment 5 is a zoom lens.

Figure 10A:
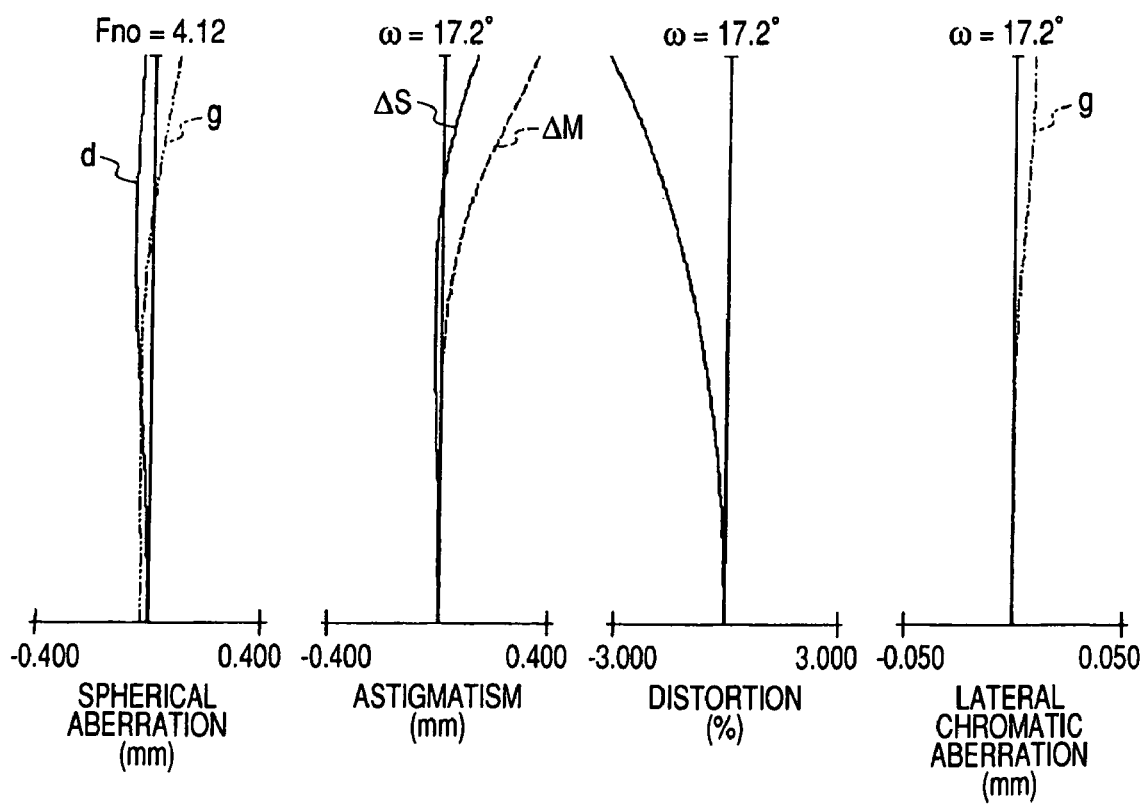
FIGS. 10A, 10B, and 11C are aberration charts in the optical system according to Embodiment 5 of the present invention at an environmental temperature of 25° C.
Figure 10B:
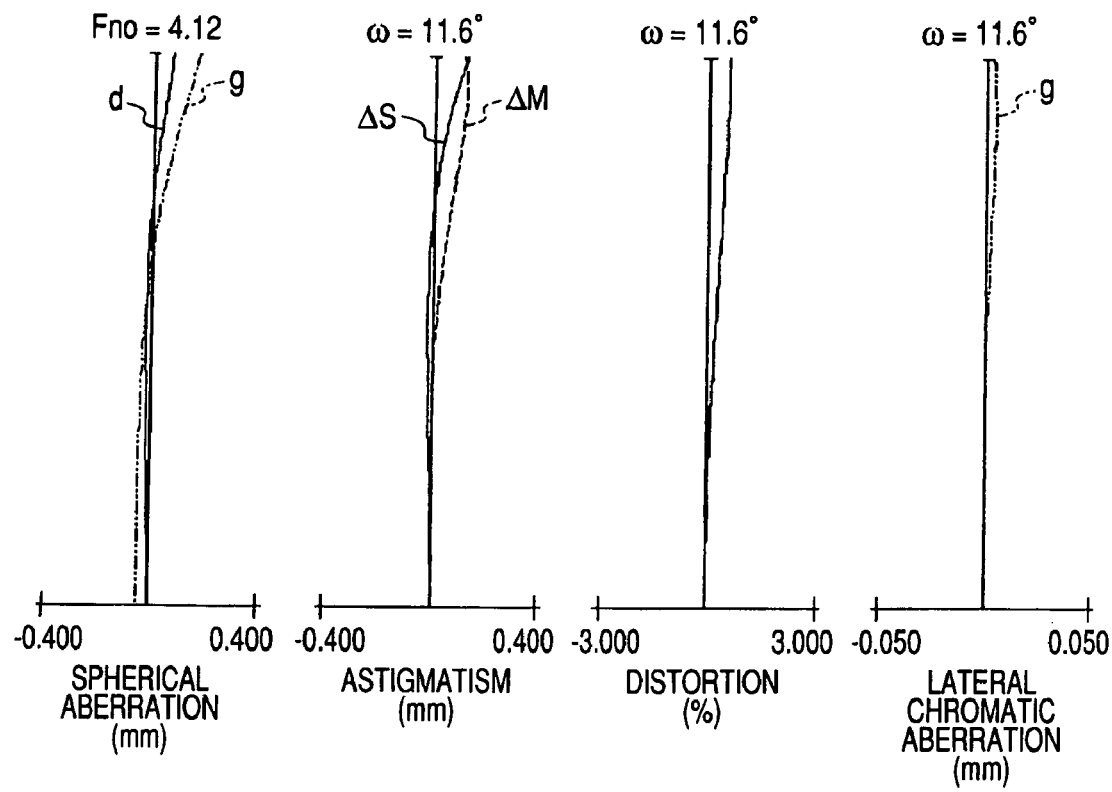
Figure 10C:
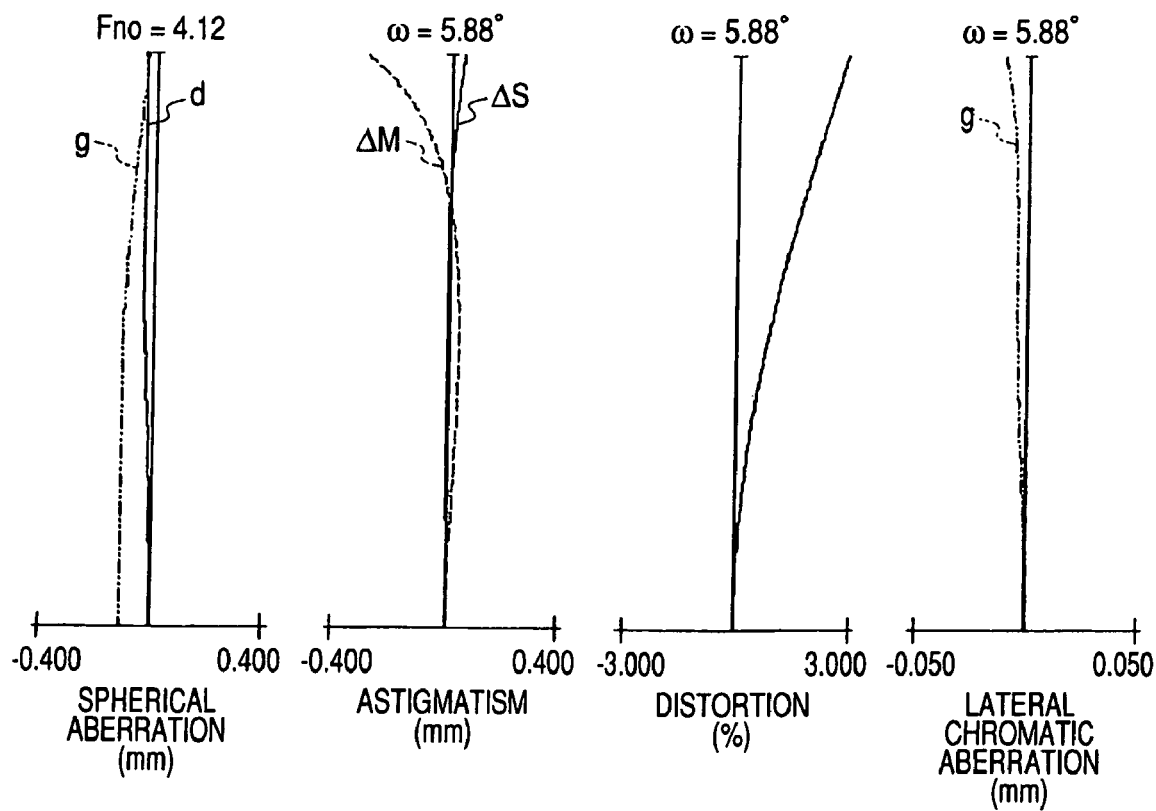

FIGS. 10A, 10B, and 10C are aberration charts at an environmental temperature of 25° C., which correspond to a wide-angle end, an intermediate zoom position, and a telephoto end, respectively.

Figure 11A:
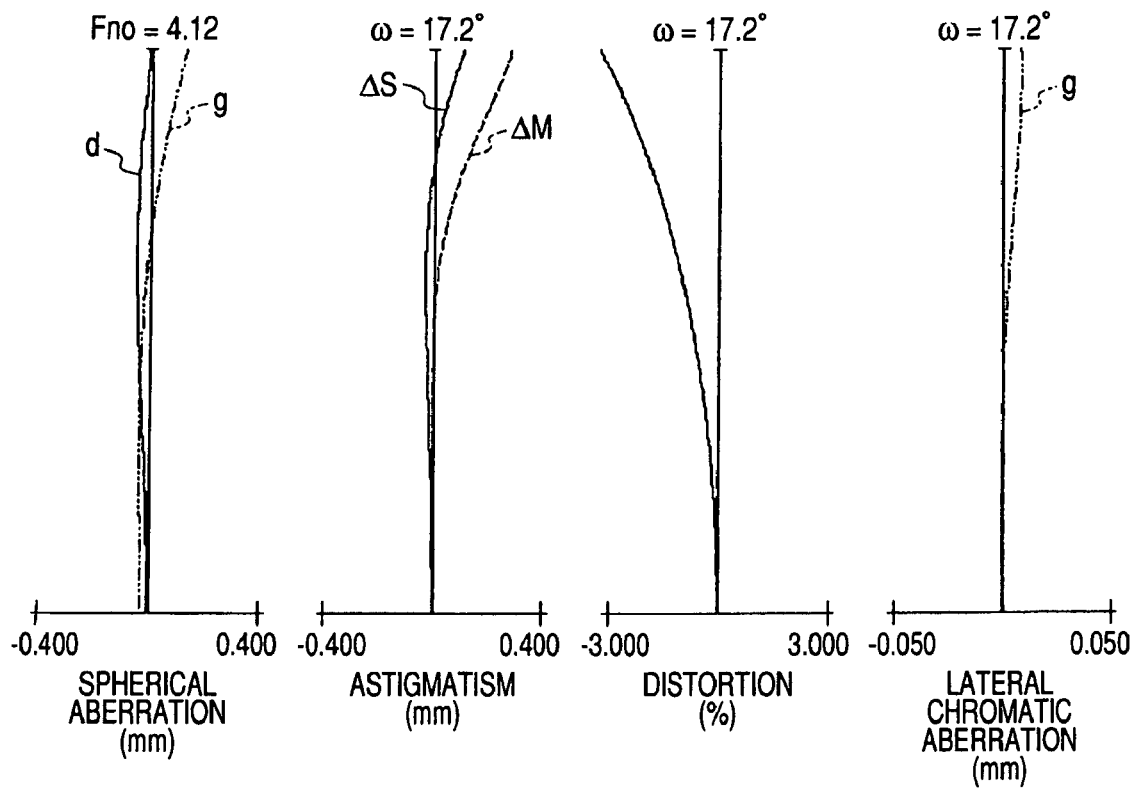
Figure 11B:
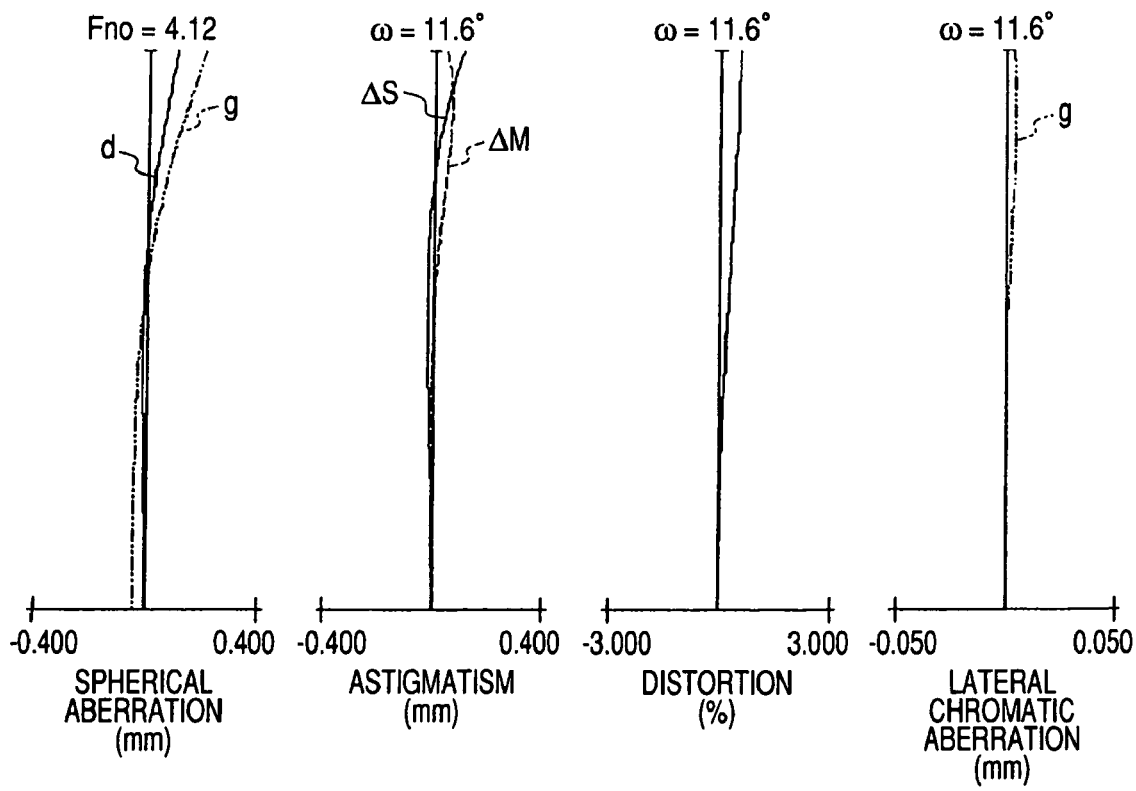
Figure 11C:
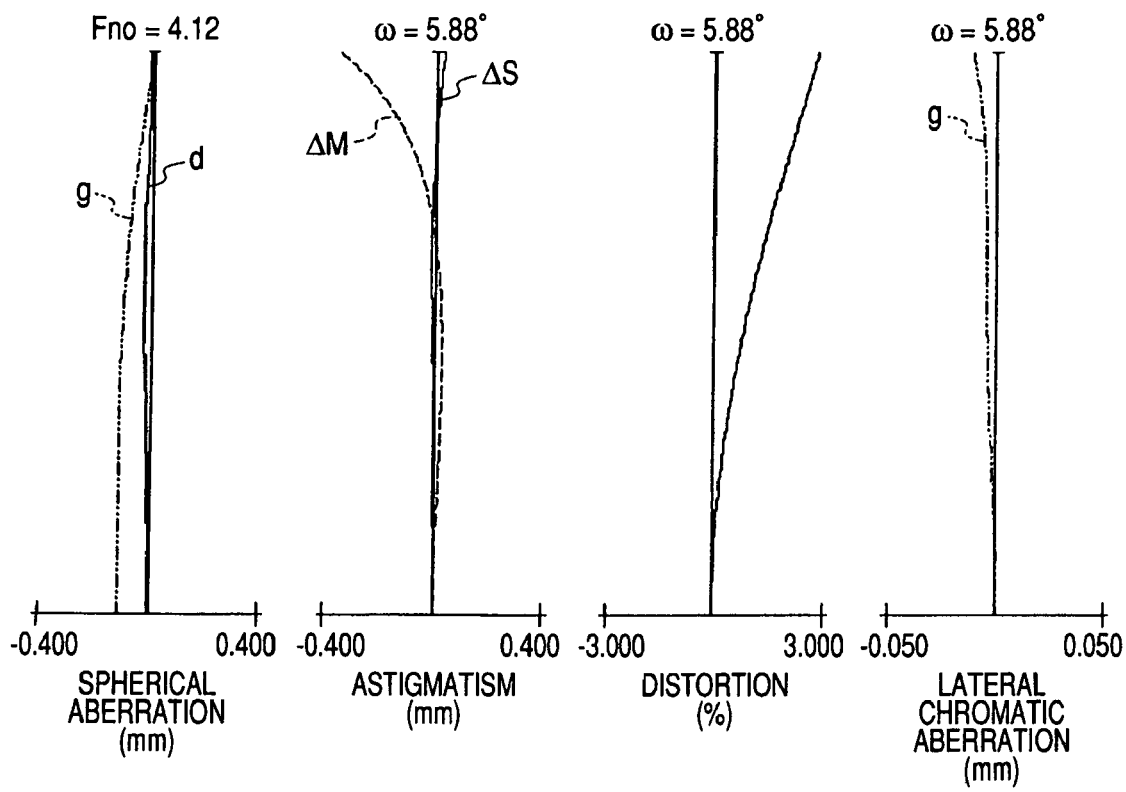

FIGS. 11A, 11B, and 11C are aberration charts at an environmental temperature of 40° C., which correspond to the wide-angle end, the intermediate zoom position, and the telephoto end, respectively.

Figure 12A:
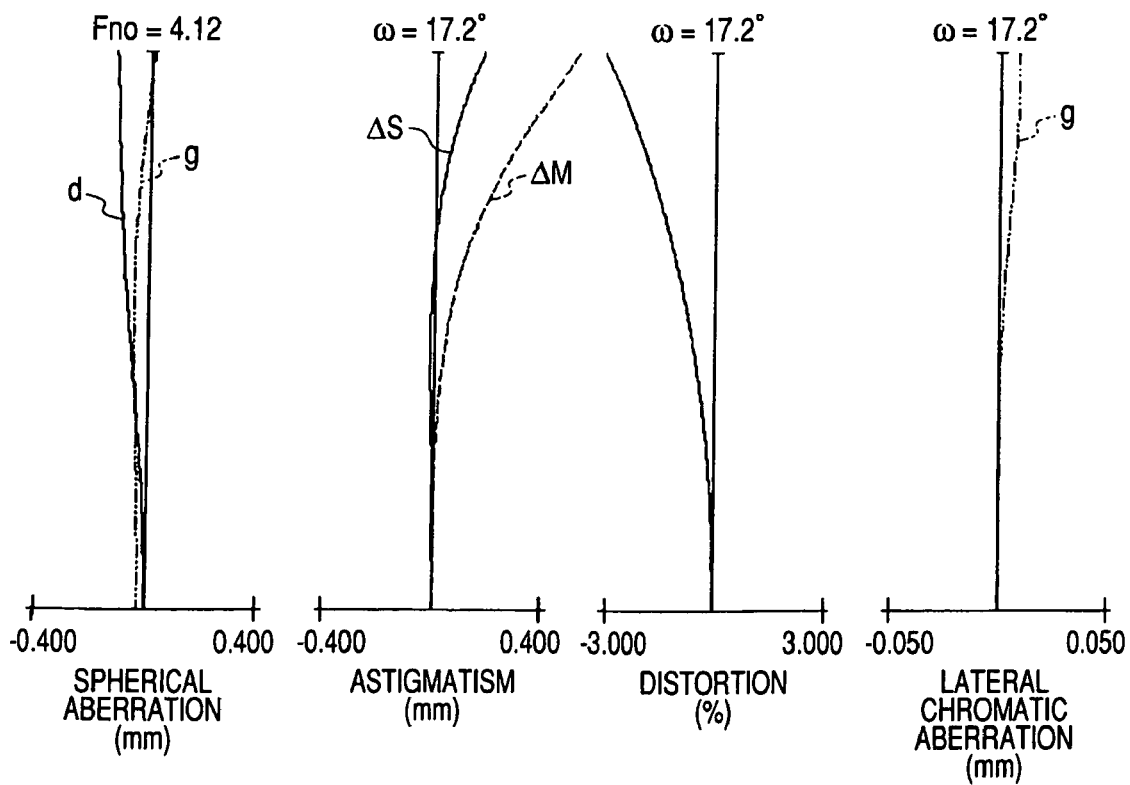

FIGS. 12A, 12B, and 12C are aberration charts at an environmental temperature of −20° C., which correspond to the wide-angle end, the intermediate zoom position, and the telephoto end, respectively.

Figure 13:
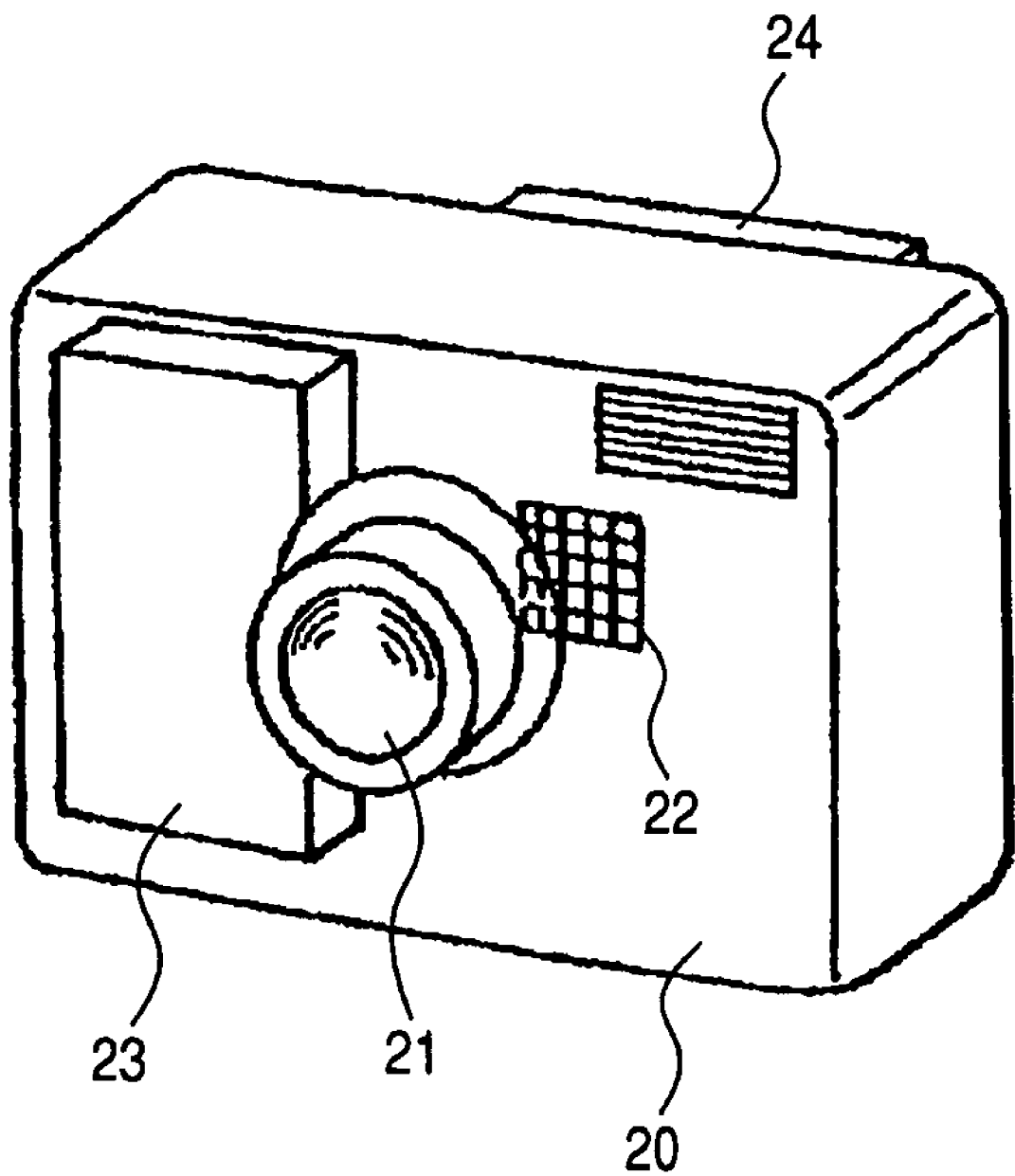
FIG. 13 is a schematic view illustrating a principal part of an image pickup apparatus according to the present invention.

FIG. 13 is a schematic view illustrating a principal part of an optical apparatus according to the present invention.

In each of the lens cross sectional views of FIGS. 1, 3, 5, 7, and 9, the left side corresponds to the object side (front side or enlargement side) and the right side corresponds to the image side (rear side or reduction side).

When the optical system according to each of the embodiments is used as a projection lens for a projector, the left side corresponds to a screen and the right side corresponds to an image to be projected.

In FIGS. 1, 3, 5, 7, and 9, the optical system is denoted by OL. When "i" is assumed to denote a lens unit order counted from the object side (light incident side), an i-th lens unit is denoted by Li. The aperture stop and an image plane are denoted by SP and IP, respectively. When the optical system is used as an image taking optical system for a video camera or a digital still camera, the image plane IP corresponds to an image pickup surface of a solid-state image pickup element (photoelectric transducer) such as a CCD sensor or a CMOS sensor. In a case of a silver-halide film camera, the image plane IP corresponds to a film surface. The optical axis is denoted by 1.

An arrow FO indicates a direction of the movement of a lens unit during focusing from an infinitely distant object to a nearest object. In each of the aberration charts of FIGS. 2A to 2C, 4A to 4C, 6A to 6C, 8A to 8C, 10A to 10C, 11A to 11C, and 12A to 12C, a d-line, a g-line, a meridional image plane of the d-line, and a sagittal image plane of the d-line, are denoted by d, g, ΔM, and ΔS, respectively. Each distortion is illustrated with the d-line. Each lateral chromatic aberration is illustrated with the g-line. An F-number and a half field angle are denoted by Fno and ω, respectively.

The optical system according to each of the embodiments includes: the plurality of optical elements each having the refractive surfaces both on the light incident side and the light exit side; and the aperture stop.

Assume that an extraordinary partial dispersion ratio of a material (optical material) of each of the optical elements with respect to the g-line and the F-line is expressed by ΔθgF.

In this case, an optical element satisfying $0.0272 < |\Delta\theta gF|$ (1) is assumed as an l-th optical element. At least one l-th optical element is provided.

An optical element satisfying $|\Delta\theta gF| < 0.0272$ (2) is assumed as an r-th optical element.

At least one r-th optical element is provided.

Of the l-th optical element and the r-th optical element which are located in the object side or the image side with respect to the aperture stop, an i-th optical element counted from the light incident side with respect to the l-th optical element is assumed as an i-th optical element (i=1, 2, . . . , m). Similarly, a j-th optical element counted from the light incident side with respect to the r-th optical element is assumed as a j-th optical element (j=1, 2, . . . , n).

For the i-th optical element, a focal length is expressed by $fnl_i$, an Abbe number of the material is expressed by $vdnl_i$, and an extraordinary partial dispersion ratio with respect to the g-line and the F-line is expressed by $\Delta\theta gFnl_i$.

For the j-th optical element, a focal length is expressed by $fnr_j$, an Abbe number of the material is expressed by $vdnr_j$, and an extraordinary partial dispersion ratio with respect to the g-line and the F-line is expressed by $\Delta\theta gFnr_j$.

In this case, the i-th optical element and the j-th optical element satisfy the following conditions.

$$\Sigma(1/fnr_j)/\Sigma(1/fnl_i) < 0 \qquad (3)$$

$$5.0 < |\Sigma((\Delta\theta gFnl_i/vdnl_i)/fnl_i)/\Sigma((\Delta\theta gFnr_j)/vdnr_j)/fnr_j)|$$

where

Expression 1

$$\Sigma(1/fnr_i) = \sum_{i=1}^{n}(1/fnr_i) \qquad (4)$$
$$= \frac{1}{fnr_1} + \frac{1}{fnr_2} + ...$$

and similarly, $$\Sigma(1/fnl_i) = \sum_{i=1}^{m}(1/fnl_i)$$
$$= \frac{1}{fnl_1} + \frac{1}{fnl_2} + ...$$

$$\Sigma((\Delta\theta gFnl_i/vdnl_i)/fnl_i) = \sum_{i=1}^{m}((\Delta\theta gFnl_i/vdnl_i)/fnl_i)$$
$$= ((\Delta\theta gFnl_1/vdnl_1)/fnl_1) +$$
$$((\Delta\theta gFnl_2/vdnl_2)/fnl_2) + ...$$

$$\Sigma((\Delta\theta gFnr_i/vdnr_i)/fnr_i) = \sum_{i=1}^{n}((\Delta\theta gFnr_i/vdnr_i)/fnr_i)$$
$$= ((\Delta\theta gFnr_1/vdnr_1)/fnr_1) +$$
$$((\Delta\theta gFnr_2/vdnr_2)/fnr_2) + ...$$

An Abbe number vd of the material, a partial dispersion ratio $\theta gF$, and the extraordinary partial dispersion ratio $\Delta\theta gF$ are as follows.

Assume that refractive indexes of the material with respect to the g-line (435.8 nm), the F-line (486.1 nm), the d-line (587.6 nm), and the C-line nm) are expressed by Ng, NF, Nd, and NC, respectively.

In this case, the Abbe number vd, the partial dispersion ratio $\theta gF$, and the extraordinary partial dispersion ratio $\Delta\theta gF$ are expressed by the following expressions.

$$vd=(Nd-1)/(NF-NC)$$

$$\theta gF=(Ng-NF)/(NF-NC)$$

$$\Delta\theta gF=\theta gF-(-1.665\times10^{-7}\times vd^3+5.213\times10^{-5}\times vd^2-5.656\times10^{-3}vd+7.278\times10^{-1})$$

In each of the embodiments, the plurality of optical elements satisfying the Conditional Expressions (1), (2), (3), and (4) are provided in at least one of the object side and the image side with respect to the aperture stop SP. Therefore, a chromatic aberration is excellently corrected over a wide wavelength band between the g-line through the C-line, and variations in focal point, chromatic aberration, and other aberration caused by environmental changes, particularly, a change in temperature are excellently corrected.

Conditional Expression (1) expresses the extraordinary partial dispersion of the optical material of the i-th optical element. When the i-th optical element made of the optical material satisfying Conditional Expression (1) is used for the optical system, the chromatic aberration of the entire optical system is excellently corrected. When $|\Delta\theta gF|$ is smaller than the lower limit of Conditional Expression (1), it is difficult to excellently correct the chromatic aberration. This is not desirable.

Specific examples of the optical material satisfying Conditional Expression (1) include organic materials such as an acrylic ultraviolet curable resin (Nd=1.635, vd=22.7, and $\theta gF=0.69$) and N-polyvinyl carbazole (Nd=1.696, vd=17.7, and $\theta gF=0.69$). The material is not limited to the above-mentioned organic materials as long as the optical material satisfies Conditional Expression (1).

An example of an optical material different in characteristic from a normal glass material is a mixture in which the following inorganic oxide nano-fine-particles are dispersed in a synthetic resin. That is, there are $TiO_2$ (Nd=2.758, vd=9.54, and $\theta gF=0.76$) and ITO (Nd=1.857, vd=5.69, and $\theta gF=0.29$).

When the fine particles of $TiO_2$ (Nd=2.758, vd=9.54, and $\theta gF=0.76$) or ITO (Nd=1.857, vd=5.69, and $\theta gF=0.29$) are dispersed in the synthetic resin at a suitable volume ratio, the optical material satisfying Conditional Expression (1) is obtained.

$TiO_2$ is a material employed for various applications, and used as a vapor deposition material for an optical thin film such as an antireflective film in optical fields. $TiO_2$ is used as a photo catalyst and white pigment, and the fine particle of $TiO_2$ is used as cosmetic material.

ITO is known as a material for a transparent electrode and normally used for a liquid crystal display element and an electroluminescent (EL) element. In addition to this, ITO is used for an infrared blocking element and an ultraviolet blocking element.

In each of the embodiments, a desirable average diameter of fine particles dispersed in a resin is approximately 2 nm to 50 nm in consideration of the influence of scattering. In order to suppress coagulation, a dispersant may be added.

A medium material for dispersing the fine particles is desirably polymer. High mass productivity can be obtained by photo polymerization molding or thermal polymerization molding using a molding die.

A dispersion characteristic $N(\lambda)$ of a mixture in which nano-fine-particles are dispersed can be easily calculated by the following expression derived from the Drude formula which is well known. That is, a refractive index $N(\lambda)$ at a wavelength $\lambda$ is expressed by the following expression:

$$N(\lambda)=[1+V\{Npar(\lambda)^2-1\}+(1-V)\{Npoly(\lambda)^2-1\}]^{1/2}$$

where $\lambda$ denotes an arbitrary wavelength, Npar denotes a refractive index of fine particles, Npoly denotes a refractive index of polymer, and V denotes a total volume fraction of fine particles to a polymer volume.

The material is not limited to the above-mentioned optical materials as long as the material satisfies Conditional Expression (1).

Conditional Expression (2) expresses the extraordinary partial dispersion of the optical material of the j-th optical element. When $|\Delta\theta gF|$ is larger than the upper limit of Conditional Expression (2), the variation in chromatic aberration caused by the environmental changes, particularly, the change in temperature becomes larger. This is not desirable.

Specific examples of the optical material satisfying Conditional Expression (2) include organic materials such as acrylic, PC, a fluorene resin, and polystyrene, which are normally used as optical materials in many cases. The material is not limited to the above-mentioned organic materials as long as the material satisfies Conditional Expression (2).

Conditional Expression (3) expresses a condition for reducing the variations in focal point, chromatic aberration, and other aberration caused by the change in temperature of the optical system. Even in the case of the optical element using the optical material having strong extraordinary partial dispersion, it is necessary to provide a certain level of refractive power in order to correct the chromatic aberration of the entire optical system. Many optical materials having strong extraordinary partial dispersion are the organic materials such as the resins and fine particle mixture materials as described above.

In an organic material, an absolute value of a refractive index temperature change coefficient dn/dt indicating a change in refractive index caused by a change in temperature is approximately 10 times to 200 times larger than in a glass material. When the organic material is used for the optical element, a change in focal length caused by the change in temperature is large. Therefore, when the optical element made of the organic material having the strong extraordinary partial dispersion is used for the optical system, it is necessary to excellently correct the chromatic aberration and constantly take into account a change in performance caused by the change in temperature.

A value of dn/dt of a normal glass material is too small compared with the value of dn/dt of the organic material, and hence it is difficult to correct the change in refractive index of the organic material caused by the change in temperature. Therefore, in order to reduce the change in refractive index of the organic material caused by the change in temperature, organic materials having an equivalent level of refractive index temperature change coefficient dn/dt are desirably combined.

The refractive index temperature change coefficient dn/dt of the organic material normally has a negative value, and hence a sum of refractive powers (that is, reciprocals of focal length) of the plurality of optical elements made of the organic material in the optical system is desirably provided with the opposite sign so as to satisfy Conditional Expression (3), thereby combining the optical elements.

When Conditional Expression (3) is not satisfied, it is difficult to excellently correct the variations in focal point, chromatic aberration, and other aberration, and thus the performance of the optical system significantly varies because of the change in temperature.

When the numerical value range of Conditional Expression (3) is set within the following range (3a), a balance between the refractive powers of the i-th optical element and the j-th optical element which are made of the organic material is achieved and it is easy to excellently correct the variations in focal point, chromatic aberration, and other aberration.

$$-1.00 < \Sigma(1/fnr_j)/\Sigma(1/fnl_i) < -0.15 \quad (3a)$$

Conditional Expression (4) is a conditional expression for excellently correcting the chromatic aberration of the optical system and excellently correcting the variations in chromatic aberration caused by the change in temperature in the case where the optical element made of the optical material having the strong extraordinary partial dispersion is used for the optical system.

When $|\Sigma((\Delta\theta gFnl_i/vdnl_i)/fnl_i)/\Sigma((\Delta\theta gFnr_j/vdnr_j)/fnr_j)|$ is smaller than the lower limit of Conditional Expression (4), it is difficult to excellently correct the variations in chromatic aberration caused by the change in temperature. This is not desirable.

Next, the technical meaning of Conditional Expression (4) is described.

A chromatic aberration correction effect of the optical element provided in the optical system with respect to between the g-line and the F-line can be expressed as follows based on the extraordinary partial dispersion ratio $\Delta\theta gF$, the Abbe number $vd$, and a refractive index $1/f (=\phi)$.

$$(\Delta\theta gF/vd)/f \quad (a)$$

In a case of a material having the extraordinary partial dispersion ratio $\Delta\theta gF$ larger than a normal glass material, the value of Expression (a) is large, and hence the chromatic aberration correction effect with respect to between the g-line and the F-line is large.

When only a material having the small extraordinary partial dispersion ratio $\Delta\theta gF$, such as a normal glass material, is used, it is necessary to maintain a balance between the chromatic aberration between g-line and F-line and the chromatic aberration between F-line and C-line. Therefore, it has been difficult to correct both of the chromatic aberrations between g-line and F-line and between F-line and C-line at the same time.

However, when the material having the large extraordinary partial dispersion ratio $\Delta\theta gF$ is used to excellently correct the chromatic aberration between the g-line and the F-line, a chromatic aberration correction balance of another glass material of the optical system can be changed. As a result, the chromatic aberration between the F-line and the C-line can be also excellently corrected, and hence the chromatic aberration is excellently corrected over the wide wavelength band between the g-line and the C-line. However, when the material having the large extraordinary partial dispersion ratio $\Delta\theta gF$ is the organic material, the change in refractive index caused by the change in temperature is large as described above. When the refractive index changes, the Abbe number $vd$, a focal length $f$, and the extraordinary partial dispersion ratio $\Delta\theta gF$ also change. The refractive index of an organic material such as a resin normally reduces as a temperature increases. When the refractive index reduces, the focal length f becomes larger and the Abbe number $vd$ becomes smaller. Therefore, the chromatic aberration correction effect expressed by Expression (a) also varies.

For example, when a temperature increases, the chromatic aberration correction effect reduces. When a temperature reduces, the chromatic aberration correction effect increases. The chromatic aberration correction effect expressed by Expression (a) is fundamentally large, and hence the variation in chromatic aberration correction effect caused by the change in temperature is also large. Therefore, in order to excellently correct the optical performance of the optical system even under the change in temperature, it is also necessary to correct the variation in chromatic aberration correction effect.

Assume that an optical element with a positive refractive power and an optical element with a negative refractive power, which are made of a plurality of organic materials, are used to excellently correct the variation in chromatic aberration caused by the change in temperature. In such a case, when the chromatic aberration correction effects of both optical elements are combined, the following expression is obtained.

$$\Sigma((\Delta\theta g Fnl_i/\nu dnl_i)/fnl_i) \quad (b)$$

In order to excellently correct the variation in chromatic aberration caused by the change in temperature, it is desirable to reduce a variation in combination value of the chromatic aberration correction effects of both optical elements expressed by Expression (b).

When the optical elements made of the plurality of organic materials are provided so as to satisfy Conditional Expression (4), the variation caused by the change in temperature, of the chromatic aberration correction effects of both optical elements expressed by Expression (b) can be excellently corrected.

When the range of Conditional Expression (4) is set to the following range (4a), the variation in chromatic aberration caused by the change in temperature can be more excellently corrected.

$$7.0 < |\Sigma((\Delta\theta g Fnl_i/\nu dnl_i)/fnl_i)/\Sigma((\Delta\theta g Fnr_j/\nu dnr_j)/fnr_j)| \quad (4a)$$

The following range is more desirable.

$$10.0 < |\Sigma((\Delta\theta g Fnl_i/\nu dnl_i)/fnl_i)/\Sigma((\Delta\theta g Fnr_j/\nu dnr_j)/fnr_j)| \quad (4b)$$

As described above, according to the present invention, the optical system in which the chromatic aberration can be excellently corrected and the variations in focal point, chromatic aberration, and other aberration caused by the change in temperature are excellently corrected can be obtained.

The plurality of optical elements satisfying Conditional Expressions (1) to (4) are provided in at least one of the object side and the image side with respect to the aperture stop, to thereby realize an optical system in which the chromatic aberration is excellently corrected over the wide wavelength band and the change in optical performance caused by the environmental changes is small.

It is more desirable to satisfy at least one of the following conditions.

Assume that average values of the Abbe numbers $\nu d$ of the materials of the i-th optical element (i=1, 2, ..., m) and the j-th optical element (j=1, 2, ..., n) which are provided in one of the object side and the image side with respect to the aperture stop SP are denoted by $\nu dnl_{ave}$ and $\nu dnr_{ave}$, respectively.

Assume that an absolute value of an average value of a change in refractive index with respect to the d-line, which is caused by a change in temperature range of 0° C. to 40° C., of each of the materials of the i-th optical element (i=1, 2, ..., m) and the j-th optical element (j=1, 2, ..., n) is denoted by $|dn/dt|$.

Assume that a focal length of the entire optical system (at wide-angle end in a case where optical system is zoom lens) is denoted by $f_{total}$.

In such a case, it is desirable to satisfy at least one of the following conditional expressions.

$$0.3 < \nu dnl_{ave}/\nu dnr_{ave} < 2.0 \quad (5)$$

$$|dn/dt| > 5.0 \times 10^{-5}/°C. \quad (6)$$

$$(1/f_{total})/\Sigma|(1/fnl_i)| < 15 \quad (7)$$

Conditional Expression (5) is a conditional expression for reducing the variation in chromatic aberration between the F-line and the C-line, which is caused by the change in temperature and excellently correcting the variation in chromatic aberration between the g-line and the F-line.

When Conditional Expression (5) is satisfied, the variation in chromatic aberration caused by the change in temperature can be reduced over the wide wavelength band between the g-line and the C-line.

Conditional Expression (6) defines the change in refractive index with respect to the d-line, which is caused by the change in temperature, of the organic material provided in one of the object side and the image side with respect to the aperture stop SP in each of the optical systems. Conditional Expression (6) defines the absolute value of the average value in the temperature range of 0° C. to 40° C.

In particular, Conditional Expression (6) is a conditional expression for excellently correcting the variations in focal point, chromatic aberration, and other aberration caused by the change in temperature in the case where the optical elements made of the organic materials are used for the optical system. When any one of the optical elements does not satisfy Conditional Expression (6), it is difficult to excellently correct the variations in focal point, chromatic aberration, and other aberration caused by the change in temperature.

Conditional Expression (7) is a conditional expression for excellently correcting the chromatic aberration of the entire optical system in a case where the organic material having strong extraordinary partial dispersion is used for the i-th optical element for refraction in the optical system.

Even in the case of the organic material having strong extraordinary partial dispersion, it is necessary to increase a refractive power (reciprocal of focal length) in order to correct the chromatic aberration of the entire optical system. Therefore, when the i-th optical element made of the organic material is provided with a refractive power so as to satisfy Conditional Expression (7), the chromatic aberration of the entire optical system can be excellently corrected.

When Conditional Expression (7) is not satisfied, it is difficult to excellently correct the chromatic aberration of the entire optical system. This is not desirable.

Next, the optical system according each of the embodiments is described.

The optical system OL according to Embodiment 1 as illustrated in FIG. 1 is a telephoto lens having a focal length of 294 mm. The stop SP is included in the telephoto lens OL. A first lens unit L1 which is not moved during focusing is provided in the object side with respect to the stop SP. The first lens unit L1 includes: a positive lens $Gnl_1$ made of an acrylic ultraviolet curable resin $nl_1$ having strong extraordinary partial dispersion; and a negative lens $Gnr_1$ made of a fluorene resin $nr_1$.

A second lens unit L2 of the optical system according to Embodiment 1 is a focusing unit (focus lens unit), and moves to the image side in the optical axis direction as indicated by the arrow FO as an object distance shortens (during focusing from infinitely distant object to nearest object). A third lens unit L3 is not moved during focusing.

In the optical system according to Embodiment 1, the positive lens made of the ultraviolet curable resin $nl_1$ is used for the first lens unit L1 located in the object side in which a passing position of a paraxial marginal ray from the optical axis 1 is relatively high. Therefore, a small optical system is realized in which an axial chromatic aberration and a lateral chromatic aberration are excellently corrected and a telephoto ratio is 0.77.

A lens made of the fluorene resin $nr_1$ is used as the negative lens in the first lens unit L1 provided in the object side with respect to the stop SP. The second lens unit L2 for focusing is moved as appropriate to one of the object side and the image side to excellently correct the variations in focal point, chromatic aberration, and other aberration caused by the change in temperature as can be seen from the aberration charts of FIGS. 2A to 2C.

The optical system OL according to Embodiment 2 as illustrated in FIG. 3 is a telephoto lens having a focal length of 392 mm. The stop SP is included in the telephoto lens OL. A first lens unit L1 which is not moved during focusing is provided in the object side with respect to the stop SP. The first lens unit L includes: a negative lens $Gnl_1$ made of an ITO fine particle dispersion material $nl_1$ having strong extraordinary partial dispersion; and a positive lens $Gnr_1$ made of a fluorene resin $nr_1$.

A second lens unit L2 of the optical system according to Embodiment 2 is a focus lens unit, and moves to the image side in the optical axis direction as indicated by the arrow FO as the object distance shortens. A third lens unit L3 is not moved during focusing.

In the optical system according to Embodiment 2, the negative lens made of the ITO fine particle dispersion material $nl_1$ is used for the first lens unit L1 located in the object side in which a passing position of a paraxial marginal ray from the optical axis 1 is relatively high. Therefore, a small optical system is realized in which an axial chromatic aberration and a lateral chromatic aberration are excellently corrected and a telephoto ratio is 0.59.

A lens made of the fluorene resin $nr_1$ is used as the positive lens in the first lens unit L1 provided in the object side with respect to the stop SP. The second lens unit L2 for focusing is moved as appropriate to one of the object side and the image side to excellently correct the variations in focal point, chromatic aberration, and other aberration caused by the change in temperature as can be seen from the aberration charts of FIGS. 4A to 4C.

The optical system OL according to Embodiment 3 as illustrated in FIG. 5 is a telephoto lens having a focal length of 780 mm. The stop SP is included in the telephoto lens OL. A first lens unit L1 which is not moved during focusing is provided in the object side with respect to the stop SP. The first lens unit L1 includes: positive lenses $Gnl_1$ and $Gnl_2$ made of $TiO_2$ fine particle dispersion materials $nl_1$ and $nl_2$ each having strong extraordinary partial dispersion; and a negative lens $Gnr_1$ made of a fluorene resin $nr_1$.

A second lens unit L2 of the optical system according to Embodiment 3 is a focus lens unit, and moves to the image side in the optical axis direction as indicated by the arrow FO as the object distance shortens. A third lens unit L3 is not moved during focusing.

In the optical system according to Embodiment 3, the positive lens made of the $TiO_2$ fine particle dispersion materials $nl_1$ and $nl_2$ is used for the first lens unit L1 which is not moved and located in the object side in which a passing position of a paraxial marginal ray from the optical axis 1 is relatively high. Therefore, a small optical system is realized in which an axial chromatic aberration and a lateral chromatic aberration are excellently corrected and a telephoto ratio is 0.59.

A lens made of the fluorene resin $nr_1$ is used as the positive lens in the first lens unit L1 provided in the object side with respect to the stop SP. The second lens unit L2 for focusing is moved as appropriate to one of the object side and the image side to excellently correct the variations in focal point, chromatic aberration, and other aberration caused by the change in temperature as can be seen from the aberration charts of FIGS. 6A to 6C.

The optical system OL according to Embodiment 4 as illustrated in FIG. 7 is a wide-angle lens having a focal length of 14 mm. The stop SP is included in the wide-angle lens OL. A second lens unit L2 is provided in the image side with respect to the stop SP. The second lens unit L2 includes: a positive lens $Gnl_1$ made of an N-polyvinyl carbazole $nl_1$ having strong extraordinary partial dispersion; and a negative lens $Gnr_1$ made of a PC resin $nr_1$.

The second lens unit L2 of the optical system according to Embodiment 4 is a focus lens unit, and moves to the image side in the optical axis direction as indicated by the arrow FO as the object distance shortens.

In the optical system according to Embodiment 4, the positive lens made of the N-polyvinyl carbazole $nl_1$ is used for the second lens unit L2 located in the image side in which a passing position of a paraxial chief ray from the optical axis 1 is relatively high, whereby a lateral chromatic aberration is excellently corrected.

A lens made of the PC resin $nr_1$ is used as the negative lens in the second lens unit L2 provided in the image side with respect to the stop SP. The second lens unit L2 is moved as appropriate to one of the object side and the image side to excellently correct the variations in focal point, chromatic aberration, and other aberration caused by the change in temperature as can be seen from the aberration charts of FIGS. 8A to 8C.

The optical system OL according to Embodiment 5 as illustrated in FIG. 9 is a zoom lens having a focal length which can be changed within a range between 70 mm and 210 mm. The zoom lens includes a front lens group LF including a plurality of lens units for magnification and a rear lens group LR including a plurality of lens units for magnification. The stop SP is included in the zoom lens OL. Positive lenses $Gnl_1$ and $Gnl_2$ made of ultraviolet curable resins $nl_1$ and $nl_2$ having strong extraordinary partial dispersion are used for a fourth lens unit L4 and a sixth lens unit L6 which are provided in the image side with respect to the stop SP. A negative lens $Gnr_1$ made of a fluorene resin $nr_1$ is also used.

In the optical system OL according to Embodiment 5, the front lens group LF located in the object side with respect to the stop SP includes a first lens unit L1 having a positive refractive power, a second lens unit L2 having a negative refractive power, and a third lens unit L3 having a positive refractive power.

In the optical system OL according to Embodiment 5, during zooming from the wide-angle end to the telephoto end, the second lens unit having the negative refractive power moves to the image side and the third lens unit having the positive refractive power first moves to the image side and then moves to the object side along a locus convex to the image side.

A fifth lens unit L5 of the optical system according to Embodiment 5 is a focus lens unit, and moves to the object side in the optical axis direction as indicated by the arrow FO as the object distance shortens.

In the optical system according to Embodiment 5, the positive lens made of the ultraviolet curable resin is used for each of the fourth lens unit L4 located close to the stop SP and a sixth lens unit L6 located in the image side in which a passing position of a paraxial chief ray from the optical axis 1 is relatively high. Therefore, an axial chromatic aberration and a lateral chromatic aberration are excellently corrected over the entire zoom range.

A lens made of the fluorene resin $nr_1$ is used as the negative lens in the sixth lens unit L6 located in the image side with respect to the stop SP. The focus lens unit L5 is moved as appropriate to one of the object side and the image side to excellently correct the variations in focal point, chromatic aberration, and other aberration caused by the change in temperature as can be seen from the aberration charts of FIGS. 10A to 10C, 11A to 11C, and 12A to 12C.

Hereinafter, specific numerical value data of the optical systems according to Numerical Embodiments 1 to 5 corresponding to Embodiments 1 to 5 of the present invention is described. A surface number is counted in order from the object side to the image side.

In Numerical Embodiments, R denotes a curvature radius (mm) of an i-th surface counted from the object side and D denotes an axial surface interval (mm) between the i-th surface and an (i+1)-th surface. In addition, Nd and vd denote a refractive index and Abbe number of an i-th medium with respect to the d-line.

The organic materials used in the optical system are expressed by $nl_1$, $nl_2$, and $nr_1$. A back focus is expressed by BF. A total lens length indicates a distance between the first surface and the image plane.

An aspherical surface is indicated by adding a mark of * after a surface number. It is assumed that a displacement amount from a surface vertex in the optical axis direction is expressed by X, a height from the optical axis in a direction perpendicular to the optical axis is expressed by h, a paraxial curvature radius is expressed by r, a conic constant is expressed by k, and aspherical coefficients of respective orders are expressed by B, C, D, E, and the like. In such a case, an aspherical surface shape is expressed as follows.

$$x(h) = \frac{(1/r)h^2}{1+\sqrt{\{1-(1+k)(h/r)^2\}}} + Bh^4 + Ch^6 + Dh^8 + Eh^{10} \ldots$$

Note that "E+XX" in each of the aspherical coefficients indicates "$\times 10^{\pm XX}$".

In each of Embodiments 2 and 3, a lens made of an organic material in which $TiO_2$ fine particles (15%) and ITO fine particles (20%) are dispersed in an ultraviolet curable resin which is a host polymer is used. Refractive indices of $TiO_2$ and ITO fine particle dispersion materials are calculated based on the values obtained by calculation using the Drude formula as described above.

Table 1 shows amounts corresponding to Conditional Expressions (1) to (7) with regard to the optical elements $Gnl_1$, $Gnl_2$, and $Gnr_1$ made of the organic materials used in Embodiments 1 to 5.

Table 2 shows optical constants of the organic materials used in Embodiments 1 to 5. Table 3 shows optical constants of the ultraviolet curable resin which is the fine particle dispersion material and used in Embodiments 2 and 3 and optical constants of each of the $TiO_2$ and ITO fine particles.

Numerical Embodiment 1

Unit: mm

Surface data

| Surface number | R | D | Nd | vd | Effective diameter | |
|---|---|---|---|---|---|---|
| 1 | 144.155 | 8.95 | 1.60311 | 60.6 | 71.00 | |
| 2 | −231.746 | 0.15 | | | 70.66 | |
| 3 | 112.350 | 6.00 | 1.48749 | 70.2 | 66.56 | |
| 4 | 225.809 | 4.35 | 1.63555 | 22.7 | 64.76 | nl1 |
| 5 | −289.155 | 0.10 | 1.62524 | 25.2 | 64.65 | nr1 |

-continued

Unit: mm

| | | | | | |
|---|---|---|---|---|---|
| 6 | 10424.851 | 2.85 | | | 63.62 |
| 7 | −293.634 | 3.40 | 1.84666 | 23.9 | 62.59 |
| 8 | 143.817 | 0.15 | | | 59.74 |
| 9 | 58.588 | 7.05 | 1.60311 | 60.6 | 58.39 |
| 10 | 150.777 | 14.60 | | | 57.21 |
| 11 | 40.692 | 4.18 | 1.88300 | 40.8 | 44.01 |
| 12 | 32.428 | 10.77 | | | 39.65 |
| 13 (Stop) | ∞ | 4.00 | | | 37.49 |
| 14 | 352.768 | 2.84 | 1.84666 | 23.9 | 35.10 |
| 15 | −136.556 | 2.00 | 1.88300 | 40.8 | 34.67 |
| 16 | 81.708 | 31.41 | | | 33.13 |
| 17 | 155.433 | 1.60 | 1.84666 | 23.9 | 27.82 |
| 18 | 25.149 | 6.64 | 1.74950 | 35.3 | 27.80 |
| 19 | −151.447 | 0.15 | | | 27.93 |
| 20 | 111.143 | 4.47 | 1.80610 | 33.3 | 27.90 |
| 21 | −45.041 | 1.50 | 1.77250 | 49.6 | 27.73 |
| 22 | 40.983 | 7.53 | | | 26.92 |
| 23 | −58.459 | 1.50 | 1.88300 | 40.8 | 28.01 |
| 24 | −117.453 | 6.91 | | | 28.91 |
| 25 | 93.274 | 10.54 | 1.53172 | 48.8 | 33.82 |
| 26 | −23.896 | 1.80 | 1.48749 | 70.2 | 34.17 |
| 27 | −148.225 | 81.10 | | | 35.34 | various data

| | |
|---|---|
| Focal length | 294.00 |
| F-number | 4.14 |
| Half field angle | 4.21 |
| Image height | 21.64 |
| Total lens length | 226.55 |
| BF | 81.10 |
| Entrance pupil position | 94.76 |
| Exit pupil position | −88.43 |
| Front principal point position | −121.08 |
| Rear principal point position | −212.89 |

Lens unit data

| Unit | First surface | Focal length | Lens structure length | Front principal point position | Rear principal point position |
|---|---|---|---|---|---|
| 1 | 13 | 134.37 | 62.55 | −29.19 | −64.48 |
| 2 | 16 | −116.18 | 4.84 | 3.31 | 0.69 |
| 3 | 27 | 1003.65 | 42.64 | 114.34 | 90.63 |

Single lens data

| Lens | First surface | Focal length |
|---|---|---|
| 1 | 1 | 148.69 |
| 2 | 3 | 450.86 |
| 3 | 4 | 200.16 |
| 4 | 5 | −449.99 |
| 5 | 7 | −113.61 |
| 6 | 9 | 154.43 |
| 7 | 11 | −237.12 |
| 8 | 14 | 116.59 |
| 9 | 15 | −57.65 |
| 10 | 17 | −35.64 |
| 11 | 18 | 29.25 |
| 12 | 20 | 40.28 |
| 13 | 21 | −27.57 |
| 14 | 23 | −133.40 |
| 15 | 25 | 36.93 |
| 16 | 26 | −58.72 |

Numerical Embodiment 2

Unit: mm

Surface data

| Surface number | R | D | Nd | vd | Effective diameter |
|---|---|---|---|---|---|
| 1 | 144.106 | 11.66 | 1.71999 | 50.2 | 95.11 |
| 2 | −1135.555 | 0.20 | 1.59631 | 13.9 | 94.36 nl1 |
| 3 | −48945.786 | 0.15 | | | 93.99 |
| 4 | 102.266 | 13.00 | 1.48749 | 70.2 | 88.65 |
| 5 | 5933.580 | 0.79 | 1.62524 | 25.2 | 86.64 nr1 |
| 6 | −2619.409 | 5.37 | | | 86.47 |
| 7 | −860.570 | 4.00 | 1.80610 | 33.3 | 81.29 |
| 8 | 133.692 | 5.73 | | | 76.07 |
| 9 | 60.422 | 9.31 | 1.48749 | 70.2 | 71.10 |
| 10 | 150.870 | 12.50 | | | 69.76 |
| 11 | 43.335 | 5.00 | 1.84666 | 23.9 | 54.74 |
| 12 | 33.980 | 25.08 | | | 48.45 |
| 13 | 146.715 | 1.80 | 1.43387 | 95.1 | 37.50 |
| 14 | 57.828 | 34.23 | | | 35.73 |
| 13 (Stop) | ∞ | 2.00 | | | 21.26 |
| 16 | 289.805 | 1.30 | 1.88300 | 40.8 | 20.26 |
| 17 | 37.066 | 3.75 | 1.57099 | 50.8 | 19.59 |
| 18 | −3406.533 | 2.00 | | | 19.75 |
| 19 | 100.959 | 3.84 | 1.78472 | 25.7 | 20.26 |
| 20 | −70.186 | 1.30 | 1.88300 | 40.8 | 20.32 |
| 21 | 48.652 | 1.85 | | | 20.44 |
| 22 | 986.216 | 1.30 | 1.88300 | 40.8 | 20.82 |
| 23 | 137.051 | 2.41 | | | 21.21 |
| 24 | 70.326 | 6.19 | 1.62588 | 35.7 | 23.01 |
| 25 | −38.841 | 1.40 | 1.88300 | 40.8 | 23.77 |
| 26 | 514.591 | 10.70 | | | 24.74 |
| 27 | 81.882 | 5.12 | 1.57501 | 41.5 | 31.93 |
| 28 | −136.733 | 1.00 | | | 32.47 |
| 29 | ∞ | 2.00 | 1.51633 | 64.1 | 60.00 |
| 30 | ∞ | 55.00 | | | 60.00 |

Various data

| | |
|---|---|
| Focal length | 391.86 |
| F-number | 4.12 |
| Half field angle | 3.16 |

Unit: mm

| | |
|---|---|
| Image height | 21.64 |
| Total lens length | 230.00 |
| BF | 55.00 |
| Entrance pupil position | 618.53 |
| Exit pupil position | −46.20 |
| Front principal point position | −506.90 |
| Rear principal point position | −336.86 |

Lens unit data

| Unit | First surface | Focal length | Lens structure length | Front principal point position | Rear principal point position |
|---|---|---|---|---|---|
| 1 | 12 | 156.04 | 67.72 | −40.04 | −69.95 |
| 2 | 1.4 | −221.35 | 1.80 | 2.08 | 0.82 |
| 3 | 30 | −150.74 | 46.17 | −22.06 | −72.04 |

Single lens data

| Lens | First surface | Focal length |
|---|---|---|
| 1 | 1 | 178.29 |
| 2 | 2 | −1949.50 |
| 3 | 4 | 213.30 |
| 4 | 5 | 2906.51 |
| 5 | 7 | −143.29 |
| 6 | 9 | 200.00 |
| 7 | 11 | −246.23 |
| 8 | 13 | −221.35 |
| 9 | 16 | −48.25 |
| 10 | 17 | 64.24 |
| 11 | 19 | 53.29 |
| 12 | 20 | −32.38 |
| 13 | 22 | −180.39 |
| 14 | 24 | 40.87 |
| 15 | 25 | −40.85 |
| 16 | 27 | 89.83 |
| 17 | 29 | 0.00 |

Numerical Embodiment 3

Unit: mm

Surface data

| Surface number | R | D | Nd | vd | Effective diameter |
|---|---|---|---|---|---|
| 1 | 316.442 | 11.93 | 1.57135 | 53.0 | 134.55 |
| 2 | −1654.918 | 2.00 | 1.76498 | 15.0 | 134.01 nl1 |
| 3* | −718.587 | 4.98 | | | 133.98 |
| 4 | 156.130 | 10.85 | 1.48749 | 70.2 | 125.77 |
| 5 | 370.543 | 2.00 | 1.76498 | 15.0 | 124.22 nl2 |
| 6* | 552.543 | 5.55 | | | 124.08 |
| 7 | 8485.416 | 6.02 | 1.92286 | 18.9 | 122.41 |
| 8 | 318.390 | 0.10 | 1.62524 | 25.2 | 118.18 nr1 |
| 9* | 242.275 | 87.95 | | | 117.49 |
| 10 | 114.937 | 9.36 | 1.77250 | 49.6 | 91.95 |
| 11 | 350.789 | 3.15 | | | 90.54 |
| 12 | 91.775 | 5.50 | 1.84666 | 23.9 | 83.04 |
| 13 | 67.046 | 84.53 | | | 76.52 |
| 14 | 210.358 | 3.07 | 1.74000 | 28.3 | 38.56 |
| 15 | −164.190 | 2.00 | 1.83400 | 37.2 | 38.17 |
| 16 | 89.325 | 37.07 | | | 36.51 |
| 17 (Stop) | ∞ | 24.81 | | | 27.36 |
| 18 | 95.300 | 1.40 | 1.84666 | 23.8 | 23.35 |
| 19 | 27.033 | 5.22 | 1.62004 | 36.3 | 23.10 |

-continued

Unit: mm

| | | | | | |
|---|---|---|---|---|---|
| 20 | −165.855 | 2.00 | | | 23.20 |
| 21 | 137.983 | 3.78 | 1.74077 | 27.8 | 23.15 |
| 22 | −74.006 | 1.40 | 1.77250 | 49.6 | 22.96 |
| 23 | 49.585 | 3.39 | | | 22.70 |
| 24 | −67.097 | 1.40 | 1.77250 | 49.6 | 22.96 |
| 25 | 195.830 | 2.49 | | | 23.75 |
| 26 | −272.654 | 5.10 | 1.62588 | 35.7 | 24.90 |
| 27 | −25.856 | 1.40 | 1.88300 | 40.8 | 25.71 |
| 28 | −67.859 | 14.64 | | | 27.45 |
| 29 | 438.898 | 6.19 | 1.54814 | 45.8 | 37.16 |
| 30 | −46.607 | 2.00 | | | 37.77 |
| 31 | ∞ | 2.65 | 1.51633 | 64.1 | 60.00 |
| 32 | ∞ | 107.55 | | | 60.00 |

Aspherical surface data

| | Conic constant (K) | Fourth-order coefficient (B) | Sixth-order coefficient (C) | Eighth-order coefficient (D) | Tenth-order coefficient (E) |
|---|---|---|---|---|---|
| Third surface | k = −9.175520E−01 | B = 2.377910E−11 | C = −6.280700E−14 | D = −4.180260E−18 | E = 4.882670E−22 |
| Sixth surface | k = 2.993210E−01 | B = 4.241350E−10 | C = 8.192190E−14 | D = 1.327980E−17 | E = 1.095400E−21 |
| Ninth surface | k = 3.115530E−01 | B = −3.345230E−10 | C = 2.276630E−14 | D = −4.366410E−18 | E = −4.977830E−21 |

Various data

| | |
|---|---|
| Focal length | 779.99 |
| F-number | 5.80 |
| Half field angle | 1.59 |
| Image height | 21.64 |
| Total lens length | 461.49 |
| BF | 107.55 |
| Entrance pupil position | 1408.11 |
| Exit pupil position | −125.47 |
| Front principal point position | −422.70 |
| Rear principal point position | −672.43 |

Lens unit data

| Unit | First surface | Focal length | Lens structure length | Front principal point position | Rear principal point position |
|---|---|---|---|---|---|
| 1 | 13 | 274.23 | 149.40 | 23.16 | −110.92 |
| 2 | 16 | −158.73 | 5.07 | 4.39 | 1.49 |
| 3 | 32 | −6706.51 | 77.87 | −2164.68 | −3321.86 |

Single lens data

| Lens | First surface | Focal length |
|---|---|---|
| 1 | 1 | 465.97 |
| 2 | 2 | 1658.69 |
| 3 | 4 | 544.46 |
| 4 | 5 | 1463.56 |
| 5 | 7 | −358.58 |
| 6 | 8 | −1621.70 |
| 7 | 10 | 217.53 |
| 8 | 12 | −327.26 |
| 9 | 14 | 125.05 |
| 10 | 15 | −69.12 |
| 11 | 18 | −45.00 |
| 12 | 19 | 37.88 |
| 13 | 21 | 65.52 |
| 14 | 22 | −38.25 |
| 15 | 24 | −64.54 |
| 16 | 26 | 45.28 |
| 17 | 27 | −48.06 |
| 18 | 29 | 77.21 |
| 19 | 31 | 0.00 |

Numerical Embodiment 4

| Unit: mm | | | | | |
|---|---|---|---|---|---|
| Surface data | | | | | |
| Surface number | R | D | Nd | vd | Effective diameter |
| 1 | 43.774 | 3.31 | 1.77250 | 49.6 | 68.50 |
| 2 | 27.504 | 9.72 | | | 52.33 |
| 3* | 65.547 | 6.85 | 1.69350 | 53.2 | 52.00 |
| 4 | 66.290 | 0.15 | | | 48.33 |
| 5 | 36.851 | 2.00 | 1.77250 | 49.6 | 41.27 |
| 6 | 15.830 | 8.23 | | | 29.09 |
| 7 | 67.880 | 1.80 | 1.77250 | 49.6 | 28.81 |
| 8 | 17.480 | 8.50 | | | 24.16 |
| 9 | 48.015 | 2.50 | 1.77250 | 49.6 | 22.72 |
| 10 | 15.619 | 8.00 | 1.78472 | 25.7 | 20.81 |
| 11 | −173.302 | 2.51 | | | 19.38 |
| 12 | 84.734 | 8.00 | 1.48749 | 70.2 | 16.75 |
| 13 | −12.822 | 1.20 | 1.84666 | 23.9 | 13.63 |
| 14 | −17.270 | 3.78 | | | 14.15 |
| 15 | −24.481 | 1.50 | 1.88300 | 40.8 | 13.39 |
| 16 | −37.533 | 1.00 | | | 13.71 |
| 17 (Stop) | ∞ | 1.03 | | | 12.99 |
| 18 | 35.425 | 9.00 | 1.48749 | 70.2 | 13.72 |
| 19 | −20.000 | 1.50 | 1.88300 | 40.8 | 12.79 |
| 20 | 56.190 | 0.78 | | | 13.70 |
| 21 | −150.273 | 1.20 | 1.84666 | 23.9 | 14.10 |
| 22 | 29.831 | 5.32 | 1.48749 | 70.2 | 16.33 |
| 23 | −20.221 | 0.15 | | | 19.05 |
| 24 | 79.247 | 2.00 | 1.69591 | 17.7 | 25.31 nl1 |
| 25 | −306.350 | 0.20 | 1.58250 | 30.2 | 25.77 nr1 |
| 26 | 104.129 | 6.23 | 1.67790 | 55.3 | 26.69 |
| 27 | −28.878 | 38.52 | | | 27.82 |

| Aspherical surface data | | | | |
|---|---|---|---|---|
| Conic constant (K) | Fourth-order coefficient (B) | Sixth-order coefficient (C) | Eighth-order coefficient (D) | Tenth-order coefficient (E) |
| Third surface | | | | |
| k = 0.000000E+00 | B = 8.267830E−06 | C = −4.819140E−10 | D = −2.295640E−12 | E = 6.891740E−15 |

| Various data | |
|---|---|
| Focal length | 14.36 |
| F-number | 2.89 |
| Half field angle | 56.42 |
| Image height | 21.64 |
| Total lens length | 135.00 |
| BF | 38.52 |
| Entrance pupil position | 28.99 |
| Exit pupil position | −43.49 |
| Front principal point position | 40.83 |
| Rear principal point position | 24.16 |

| Lens unit data | | | | | |
|---|---|---|---|---|---|
| Unit | First surface | Focal length | Lens structure length | Front principal point position | Rear principal point position |
| 1 | 1 | −26.74 | 51.07 | 11.32 | −36.62 |
| 2 | 27 | 33.13 | 42.90 | 28.95 | −12.41 |

| Single lens data | | |
|---|---|---|
| Lens | First surface | Focal length |
| 1 | 1 | −105.12 |
| 2 | 3 | 1765.94 |
| 3 | 5 | −37.48 |
| 4 | 7 | −30.96 |
| 5 | 9 | −31.01 |
| 6 | 10 | 18.60 |

-continued

Unit: mm

| | | |
|---|---|---|
| 7 | 12 | 23.48 |
| 8 | 13 | −67.11 |
| 9 | 15 | −84.27 |
| 10 | 18 | 27.70 |
| 11 | 19 | −16.55 |
| 12 | 21 | −29.31 |
| 13 | 22 | 25.61 |
| 14 | 24 | 90.66 |
| 15 | 25 | −133.39 |
| 16 | 26 | 33.99 |

Numerical Embodiment 5

Unit: mm

Surface data

| Surface number | R | D | Nd | vd | Effective diameter |
|---|---|---|---|---|---|
| 1 | 157.405 | 2.50 | 1.84666 | 23.9 | 67.48 |
| 2 | 97.124 | 9.09 | 1.49700 | 81.5 | 66.04 |
| 3 | −412.287 | 0.15 | | | 65.60 |
| 4 | 75.503 | 8.11 | 1.48749 | 70.2 | 62.21 |
| 5 | 790.066 | (Variable) | | | 61.07 |
| 6 | 526.172 | 2.00 | 1.88300 | 40.8 | 31.57 |
| 7 | 50.309 | 5.36 | | | 29.37 |
| 8 | −85.443 | 1.50 | 1.88300 | 40.8 | 28.37 |
| 9 | 69.148 | 4.03 | 1.92286 | 18.9 | 27.96 |
| 10 | −162.029 | 1.79 | | | 27.75 |
| 11 | −51.570 | 1.50 | 1.88300 | 40.8 | 27.56 |
| 12 | −81.999 | (Variable) | | | 28.12 |
| 13 | 73.186 | 1.50 | 1.80610 | 33.3 | 29.22 |
| 14 | 34.778 | 5.81 | 1.62299 | 58.2 | 28.99 |
| 15 | −183.955 | (Variable) | | | 29.07 |
| 16 (Stop) | ∞ | 1.00 | | | 28.81 |
| 17 | 54.358 | 3.25 | 1.77250 | 49.6 | 29.36 |
| 18 | 118.994 | 0.15 | | | 29.05 |
| 19 | 22.857 | 5.06 | 1.57099 | 50.8 | 28.72 |
| 20 | 43.696 | 2.33 | | | 27.42 |
| 21 | 22.586 | 1.50 | 1.84666 | 23.9 | 25.21 |
| 22 | 15.362 | 0.68 | 1.63555 | 22.7 | 22.79 nl1 |
| 23 | 16.305 | (Variable) | | | 22.64 |
| 24 | 30.872 | 5.74 | 1.48749 | 70.2 | 21.23 |
| 25 | −39.183 | 1.70 | 1.80610 | 33.3 | 20.41 |
| 26 | −121.000 | (Variable) | | | 19.97 |
| 27 | 65.604 | 1.50 | 1.83400 | 37.2 | 18.09 |
| 28 | 21.392 | 4.52 | | | 17.77 |
| 29 | −20.577 | 1.50 | 1.77250 | 49.6 | 18.07 |
| 30 | 152.481 | 0.15 | | | 21.10 |
| 31 | 94.197 | 4.21 | 1.48749 | 70.2 | 21.93 |
| 32 | −45.861 | 1.29 | 1.63555 | 22.7 | 23.78 nl2 |
| 33 | −27.903 | 6.80 | | | 23.93 |
| 34 | 67.926 | 0.50 | 1.62524 | 25.2 | 33.81 nr1 |
| 35 | 37.881 | 7.65 | 1.62588 | 35.7 | 34.47 |
| 36 | −103.043 | 43.05 | | | 35.00 |

Various data

Zoom ratio 3.0

| | Wide angle | Intermediate | Telephoto |
|---|---|---|---|
| Focal length | 70.00 | 105.00 | 210.00 |
| F-number | 4.12 | 4.12 | 4.12 |
| Half field angle | 17.17 | 11.64 | 5.88 |
| Image height | 21.64 | 21.64 | 21.64 |
| Total lens length | 210.00 | 210.00 | 210.00 |
| BF | 43.05 | 43.05 | 43.05 |
| d5 | 2.00 | 23.39 | 44.70 |
| d12 | 43.20 | 32.50 | 0.50 |
| d15 | 12.19 | 1.50 | 12.19 |
| d23 | 13.70 | 13.70 | 13.70 |
| d26 | 3.00 | 3.00 | 3.00 |
| Entrance pupil position | 61.09 | 112.53 | 199.18 |
| Exit pupil position | −76.95 | −76.95 | −76.95 |
| Front principal point position | 90.26 | 125.65 | 41.66 |
| Rear principal point position | −26.95 | −61.95 | −166.95 |

Zoom lens unit data

| Unit | First surface | Focal length | Lens structure length | Front principal point position | Rear principal point position |
|---|---|---|---|---|---|
| 1 | 5 | 114.28 | 19.86 | 5.18 | −7.95 |
| 2 | 12 | −36.98 | 16.18 | 3.30 | −8.41 |
| 3 | 15 | 110.10 | 7.31 | 1.17 | −3.29 |
| 4 | 23 | 89.21 | 13.97 | −15.84 | −21.27 |
| 5 | 26 | 69.64 | 7.44 | 0.06 | −4.77 |
| 6 | 36 | −78.64 | 28.11 | −22.75 | −63.45 |

Single lens data

| Lens | First surface | Focal length |
|---|---|---|
| 1 | 1 | −305.34 |
| 2 | 2 | 159.10 |
| 3 | 4 | 170.61 |
| 4 | 6 | −63.12 |
| 5 | 8 | −43.09 |
| 6 | 9 | 52.96 |
| 7 | 11 | −161.11 |
| 8 | 13 | −83.67 |
| 9 | 14 | 47.43 |
| 10 | 17 | 126.77 |
| 11 | 19 | 77.12 |
| 12 | 21 | −62.69 |
| 13 | 22 | 325.86 |
| 14 | 24 | 36.40 |
| 15 | 25 | −72.56 |
| 16 | 27 | −38.66 |
| 17 | 29 | −23.38 |
| 18 | 31 | 63.90 |
| 19 | 32 | 109.08 |
| 20 | 34 | −137.85 |
| 21 | 35 | 45.20 |

TABLE 1

|  | Embodiment 1 | | Embodiment 2 | | Embodiment 3 | | |
| --- | --- | --- | --- | --- | --- | --- | --- |
|  | $Gnl_1$ | $Gnr_1$ | $Gnl_1$ | $Gnr_1$ | $Gnl_1$ | $Gnl_2$ | $Gnr_1$ |
| Organic material | Acrylic ultraviolet curable resin | Fluorene ultraviolet curable resin | ITO 20%-ultraviolet curable resin | Fluorene ultraviolet curable resin | $TiO_2$ 15%-ultraviolet curable resin | $TiO_2$ 15%-ultraviolet curable resin | Fluorene ultraviolet curable resin |
| f | 200.16 | −449.99 | −1949.50 | 2906.51 | 1658.69 | 1463.56 | −1621.70 |
| $\Sigma(1/f)$ | 5.00E−0.3 | −2.22E−03 | −5.13E−04 | 3.44E−04 | 1.29E−03 | | −6.17E−04 |
| $\nu d$ | 22.7 | 25.2 | 13.9 | 25.2 | 15.0 | 15.0 | 25.2 |
| $\nu d_{ave}$ | 22.7 | 25.2 | 13.9 | 25.2 | 15.0 | | 25.2 |
| $\theta gF$ | 0.689 | 0.626 | 0.346 | 0.626 | 0.748 | 0.748 | 0.626 |
| $\Delta\theta gF$ | 0.0651 | 0.0102 | −0.3130 | 0.0102 | 0.0939 | 0.0939 | 0.0102 |
| $\Sigma\Delta\theta gF/\nu d/f$ | 1.43E−05 | −8.97E−07 | 1.16E−05 | 1.39E−07 | 8.05E−06 | | −2.49E−07 |
| $f_{total}$ | 294.00 | | 391.86 | | 779.99 | | |
| Conditional Expressions (1) and (2) $|\Delta\theta gF|$ | 0.0651 | 0.0102 | 0.3130 | 0.0102 | 0.0939 | 0.0939 | 0.0102 |
| Conditional Expression (3) $\Sigma(1/fnr_j)/(1/fnl_i)$ | −0.44 | | −0.67 | | −0.48 | | |
| Conditional Expression (4) $|\Sigma(\Delta\theta Fnl_i/\nu dnl_i/fnl_i)|/|\Sigma(\Delta\theta gFnr_j/\nu dnr_j/fnr_j)|$ | 16.0 | | 83.4 | | 32.4 | | |
| Conditional Expression (5) $\nu dnl_{ave}/\nu dnr_{ave}$ | 0.90 | | 0.55 | | 0.594 | | |
| Conditional Expression (6) $|dn/dt|(\times 10^{-5})$ | 16.0 | 14.0 | 14.0 | 14.0 | 14.0 | 14.0 | 14.0 |
| Conditional Expression (7) $(1/f_{total})/\Sigma|(1/fnl_i)|$ | 0.681 | | 4.975 | | 0.997 | | |

|  | Embodiment 4 | | Embodiment 5 | | |
| --- | --- | --- | --- | --- | --- |
|  | $Gnl_1$ | $Gnr_1$ | $Gnl_1$ | $Gnl_2$ | $Gnr_1$ |
| Organic material | N-polyvinyl carbazole | PC | Acrylic ultraviolet curable resin | Acrylic ultraviolet curable resin | Fluorene ultraviolet curable resin |
| f | 90.66 | −133.39 | 325.86 | 109.08 | −137.85 |
| $\Sigma(1/f)$ | 1.10E−02 | −7.50E−03 | 1.22E−02 | | −7.25E−03 |
| $\nu d$ | 17.7 | 30.2 | 22.7 | 22.7 | 25.2 |
| $\nu d_{ave}$ | 17.7 | 30.2 | 22.7 | | 25.2 |
| $\theta gF$ | 0.686 | 0.596 | 0.689 | 0.689 | 0.626 |
| $\Delta\theta gF$ | 0.0424 | −0.0041 | 0.0651 | 0.0651 | 0.0102 |
| $\Sigma\Delta\theta gF/\nu d/f$ | 2.64E−05 | 1.03E−06 | 3.50E−05 | | −2.93E−06 |
| $f_{total}$ | 14.36 | | 70.00 | | |
| Conditional Expressions (1) and (2) $|\Delta\theta gF|$ | 0.0424 | 0.0041 | 0.0651 | 0.0651 | 0.0102 |
| Conditional Expression (3) $\Sigma(1/fnr_j)/(1/fnl_i)$ | −0.68 | | −0.59 | | |
| Conditional Expression (4) $|\Sigma(\Delta\theta gFnl_i/\nu dnl_i/fnl_i)|/|\Sigma(\Delta\theta gFnr_j/\nu dnr_j/fnr_j)|$ | 25.7 | | 12.0 | | |
| Conditional Expression (5) $\nu dnl_{Ave}/\nu dnr_{Ave}$ | 0.59 | | 0.900 | | |
| Conditional Expression (6) $|dn/dt|(\times 10^{-5})$ | 12.0 | 10.9 | 16.0 | 16.0 | 14.0 |
| Conditional Expression (7) $(1/f_{total})/\Sigma|(1/fnl_i)|$ | 6.313 | | 1.167 | | |

TABLE 2

| Organic material nl | Acrylic ultraviolet curable resin | TiO$_2$ 15%- ultraviolet curable resin | ITO 20%- ultraviolet curable resin | N-polyvinyl Carbazole |
|---|---|---|---|---|
| refractive index with respect to d-line | 1.63555 | 1.76498 | 1.59631 | 1.69591 |
| refractive index with respect to g-line | 1.67532 | 1.84098 | 1.63829 | 1.75164 |
| refractive index with respect to C-line | 1.62807 | 1.75182 | 1.58040 | 1.68528 |
| refractive index with respect to F-line | 1.65604 | 1.80283 | 1.62341 | 1.72465 |
| Nd | 22.7 | 15.0 | 13.9 | 17.7 |
| θgF | 0.689 | 0.748 | 0.346 | 0.686 |
| ΔθgF | 0.0651 | 0.0939 | −0.3130 | 0.0424 |
| dn/dt(×10$^{-5}$) | −16.0 | −14.0 | −14.0 | −12.0 |

| Organic material nr | Fluorene ultraviolet curable resin | PC |
|---|---|---|
| refractive index with respect to d-line | 1.62524 | 1.58250 |
| refractive index with respect to g-line | 1.65852 | 1.60770 |
| refractive index with respect to C-line | 1.61825 | 1.57690 |
| refractive index with respect to F-line | 1.64302 | 1.59620 |
| vd | 25.2 | 30.2 |
| θgF | 0.626 | 0.596 |
| ΔθgF | 0.0102 | −0.0041 |
| dn/dt(×10$^{-5}$) | −14.0 | −10.9 |

TABLE 3

| | Ultraviolet curable resin | TiO$_2$ | ITO |
|---|---|---|---|
| refractive index with respect to d-line | 1.52415 | 2.757573 | 1.85712 |
| refractive index with respect to g-line | 1.53706 | 3.03431 | 1.99244 |
| refractive index with respect to C-line | 1.52116 | 2.71051 | 1.79794 |
| refractive index with respect to F-line | 1.53133 | 2.89478 | 1.94870 |
| vd | 51.6 | 9.5 | 5.7 |
| θgF | 0.563 | 0.757 | 0.290 |

Next, an embodiment of a digital still camera (image pickup apparatus) using the optical system according to the present invention as a shooting optical system, which is an optical apparatus according to the present invention, is described with reference to FIG. 13.

In FIG. 13, the digital still camera includes a camera main body 20, a shooting optical system 21, a solid-state image pickup element (photoelectric transducer) 22 such as a CCD sensor or a CMOS sensor, a memory 23, and a finder 24. The shooting optical system 21 includes the optical system according to the present invention. The solid-state image pickup element 22 is integrated in the camera main body 20 and receives a subject image formed by the shooting optical system 21. The memory 23 stores information corresponding to the subject image subjected to photoelectric conversion by the solid-state image pickup element 22. The finder 24 includes a liquid crystal display panel and is used to observe the subject image formed on the solid-state image pickup element 22.

As described above, when the optical system according to the present invention is applied to an image pickup apparatus such as the digital still camera, an image pickup apparatus which is small in size and has high optical performance is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-119582, filed May 1, 2008, which is hereby incorporated by reference in its entirety.

What is claimed is:

1. An optical system, comprising:
 a plurality of optical elements each having refractive surfaces located on a light incident side and a light exit side; and
 an aperture stop,
 wherein letting an l-th optical element be an optical element of the plurality of optical elements which satisfies $0.0272<|\Delta\theta gF|$, and letting an r-th optical element be an optical element which satisfies $|\Delta\theta gF|<0.0272$, where $\Delta\theta gF$ represents an extraordinary partial dispersion ratio with respect to a g-line and an F-line, the l-th optical element and the r-th optical element are located in one of an object side and an image side with respect to the aperture stop,
 wherein, for the l-th optical element, letting an i-th optical element (where i=1, 2, . . . , m) be an optical element located at an i-th position from the light incident side; and, for the r-th optical element, letting a j-th optical element (where j=1, 2, . . . , n) be an optical element located at a j-th position from the light incident side, the following conditions are satisfied:

$$\Sigma(1/fnr_j)/\Sigma(1/fnl_i)<0$$

$$5.0<|\Sigma((\Delta\theta gFnl_i/vdnl_i)/fnl_i)/\Sigma((\Delta\theta gFnr_j/vdnr_j)/fnr_j)|$$

where $fnl_i$ indicates a focal length of the i-th optical element, $vdnl_i$ indicates an Abbe number of a material of the i-th optical element, $\Delta\theta gFnl_i$ indicates an extraordinary partial dispersion ratio with respect to the g-line and the F-line in the i-th optical element, $fnr_j$ indicates a focal length of the j-th optical element, $vdnr_j$ indicates an Abbe number of a material of the j-th optical element, and $\Delta\theta gFnr_j$ indicates an extraordinary partial dispersion ratio with respect to the g-line and the F-line in the j-th optical element.

2. An optical system according to claim 1, wherein the following condition is satisfied:

$$0.3<vdnl_{ave}/vdnr_{ave}<2.0$$

where $vdnl_{ave}$ and $vdnr_{ave}$ indicate an average value of the Abbe number $vdnl_i$ of the material of the i-th optical element (where i=1, 2, . . . , m) and an average value of the Abbe number $vdnr_j$ of the material of the j-th optical element (where j=1, 2, . . . , n), respectively.

3. An optical system according to claim 1, wherein each of the material of the i-th optical element and the material of the j-th optical element comprises an organic material.

4. An optical system according to claim 1, wherein the following condition is satisfied:

$$|dn/dt|>5.0\times10^{-5}/°C.$$

where |dn/dt| indicates an absolute value of an average value of a change in refractive index of each of the material of the i-th optical element (where i=1, 2, m) and the material of the j-th optical element (where j=1, 2, ..., n) with respect to a d-line, the change being caused by a change in temperature ranging from 0° C. to 40° C.

5. An optical system according to claim 1, wherein the following condition is satisfied:

$$(1/f_{total})/\Sigma|(1/fnl_i)|<15$$

where $f_{total}$ indicates a focal length of an entire optical system or at a wide-angle end when the optical system is a zoom lens.

6. An optical system according to claim 1, further comprising, in order from the object side to the image side:
   a first lens unit which has a positive refractive power, and is not moved during focusing;
   a second lens unit which has a negative refractive power, and is moved in an optical axis direction during the focusing;
   the aperture stop; and
   a third lens unit which has a positive refractive power, and is not moved during the focusing,
   wherein the i-th optical element and the j-th optical element are included in the first lens unit.

7. An optical system according to claim 1, further comprising, in order from the object side to the image side:
   a first lens unit having a negative refractive power;
   the aperture stop; and
   a second lens unit which has a positive refractive power, and is moved in an optical axis direction during focusing,
   wherein the i-th optical element and the j-th optical element are included in the second lens unit.

8. An optical system according to claim 1, further comprising:
   a front lens group having a plurality of lens units for magnification;
   the aperture stop; and
   a rear lens group having a plurality of lens units including a lens unit which is moved in an optical axis direction during focusing,
   wherein the i-th optical element and the j-th optical element are included in the rear lens group.

9. An optical system according to claim 1, which an image is formed on a photoelectric transducer.

10. An optical apparatus, comprising:
   the optical system according to claim 9; and
   a photoelectric transducer for receiving an image formed by the optical system.

* * * * *